United States Patent
Archuletta et al.

(10) Patent No.: US 6,586,504 B1
(45) Date of Patent: Jul. 1, 2003

(54) WOOD AND PLASTIC COMPOSITE MATERIAL AND METHODS FOR MAKING SAME

(75) Inventors: Phil T. Archuletta, Mountainair, NM (US); James H. Muehl, Waunakee, WI (US)

(73) Assignee: P & M Signs, Mountainair, NM (US)

( * ) Notice: Subject to any disclaimer, the term of this patent is extended or adjusted under 35 U.S.C. 154(b) by 0 days.

(21) Appl. No.: 09/558,895

(22) Filed: Apr. 26, 2000

(51) Int. Cl.$^7$ .......................... C08J 5/10; C08K 11/00; C08L 23/00

(52) U.S. Cl. ............................. 524/16; 524/13; 524/15

(58) Field of Search ............................. 524/9, 13, 14, 524/15, 16, 35

(56) References Cited

U.S. PATENT DOCUMENTS

| | | | | |
|---|---|---|---|---|
| 3,919,017 A | * | 11/1975 | Shoemaker et al. | 156/62.2 |
| 3,932,319 A | | 1/1976 | Clendinning et al. | 260/7.5 |
| 4,257,996 A | * | 3/1981 | Farrissey, Jr. et al. | 264/122 |
| 5,082,605 A | | 1/1992 | Brooks et al. | 264/40.6 |
| 5,759,680 A | | 6/1998 | Brooks et al. | 428/326 |
| 5,851,469 A | | 12/1998 | Muller et al. | 264/177.1 |

FOREIGN PATENT DOCUMENTS

| | | |
|---|---|---|
| JP | 408033430 A | 2/1996 |

OTHER PUBLICATIONS

"Opportunities for Polymeric Materials in Construction," A multiclient proposal by Battelle. Proposal No. CP021074, Jul. 6, 1993.

"Opportunities in Composites Manufacturing from Small–Diameter Resources," by Theodore L. Laufenberg, USDA–FS Forest Products Laboratory, Web site publication, Feb. 2, 2000.

"Composites From Recycled Wood and Plastics," Project Summary by J.A. Youngquist et al. USDA–FS Forest Products Laboratory, Sep., 1994.

"Wastepaper Fiber in Plastic Composites Made by Melt Blending: Demonstration of Commercial Feasibility," by G.E. Myers et al. ADSA–FS Forest Products Laboratory, Mar. 15, 1993.

"Waste–Wood–Derived Fillers for Plastics," by Brent English et al. USDA–FS Forest Products Laboratory Publication, May, 1996.

"Wood Fiber Derived from Scrap Pallets Used in Polypropylene Composites," by Nicole M. Stark. *Forest Products Journal* vol. 49, No. 6, pp. 39–46, Jun., 1999.

"Properties of Wood Fiber and Polymer Fiber Composites," by J.A. Youngquist et al. USDA–FS Forest Service Products Laboratory Publication, pp. 79–86.

"Mechanical and Physical Properties of Wood/Plastic Fiber Composites Made with Air–Formed Dry–Process Technology," by J.A. Youngquist et al. *Proceedings of the 1990 Joint Int'l Conf. on Processing & Utilization of Low–Grade Hardwoods and Int'l Trade of Forest–Related Products,* Jun. 11–13, 1990, pp. 159–162.

(List continued on next page.)

Primary Examiner—James J. Seidleck
Assistant Examiner—U. K. Rajguru
(74) Attorney, Agent, or Firm—Rod D. Baker; Peacock, Myers & Adams, PC; Brian J. Pangrle

(57) ABSTRACT

A method of preparing wood and plastic to produce a composite material.

24 Claims, 18 Drawing Sheets

OTHER PUBLICATIONS

"Mechanical and physical properties of air–formed wood–fiber/polymer–fiber composites," by J.A. Youngquist et al. *Forest Products Journal,* Jun., 1992, pp. 42–48.

"Melt–Blended Wood Fiber–Thermoplastic Composites," by Nicole Stark. *Techline: Properties and Use of Wood, Composites, and Fiber Products* USDA–FS Forest Products Laboratory, May, 1999.

*Wood/Fiber Polymer Composites: Fundamental Concepts, Processes, and Material Options,* by Forest Products Society, 1993.

"Woodfiber–Plastic Composites: Virgin and Recycled Wood Fiber and Polymers for Composites," by USDA Forest Service, Forest Products Society Proceedings No. 7293, May 1–3, 1995, pp. 3–15, 47–55, 59–62, 67–73, 99, 189–208, 247–256.

Fifth International Conference on Woodfiber–Plastic Composites, Conference Schedule, May 26–27, 1999, Madison, Wisconsin, Sponsored by the USDA Forest Service.

Fourth International Conference on Woodfiber–Plastic Composites, Conference Schedule, May 12–14, 1997, Madison Wisconsin. Sponsored by the USDA Forest Service.

* cited by examiner

WOOD AND PLASTIC COMPOSITE MATERIAL AND METHODS FOR MAKING SAME

GOVERNMENT RIGHTS

The U.S. Government has a paid-up license in this invention and the right in limited circumstances to require the patent owner to license others on reasonable terms as provided for by the terms of Grant 98-G-3138 awarded by the U.S.D.A., U.S. Forest Service.

BACKGROUND OF THE INVENTION

Field of the Invention (Technical Field):

The present invention relates to a method of preparing wood and plastic to produce a composite material.

SUMMARY OF THE INVENTION (DISCLOSURE OF THE INVENTION)

The present invention comprises a composite material comprising natural material particles and plastic wherein the natural material particles comprise an average size of less than approximately 0.25 inch. In a preferred embodiment, the particles comprise at least one dimension that is less than or equal to 0.25 inch. In a preferred embodiment of the present invention, the natural material particles comprise average moisture of less than approximately 5%, preferably less than approximately 2% and most preferably an average moisture of less than approximately 1%. According to the present invention, in a preferred embodiment, the natural material particles comprise at least one member selected from the group consisting of trunk particles, bark particles, branch particles, leaf particles, root particles, and needle particles. In a preferred embodiment, natural material particles comprise one-seed juniper particles and/or ponderosa pine particles.

According to the present invention, natural material particles optionally comprise: a random orientation in the composite material; a process-related orientation; or a combination of random and process-related orientations. For example, extrusion processes inherently involve fluid dynamics, which may orient natural particles in the composite material.

In a preferred embodiment of the present invention, the natural material particles comprise an average particle size of less than approximately 0.125 inch, preferably less than approximately 0.0625 inch, and more preferably less than or equal to approximately 0.03125 inch. It is understood that in several embodiments, natural material particles comprise unequal dimensions, for example, but not limited to, a length greater than a width. In such embodiments, a particle size refers to at least one dimension comprising the specified size. For example, a particle comprising a width of approximately 0.03 inch and a length greater than approximately 0.04 inch is capable of passing through a screen opening, or the like, of at least 0.03 inch.

In a preferred embodiment of the present invention, plastic comprises a thermoplastic. In a preferred embodiment of the present invention, plastic comprises at least one plastic selected from the group consisting of polypropylene, polyethylene, polyurethane and polyvinylchloride. In a preferred embodiment, plastic comprises recycled plastic, virgin plastic and/or a combination of both.

In a preferred embodiment of the present invention, the composite material comprises at least approximately 20% by weight of natural material particles, preferably at least approximately 40% by weight of natural material particles and more preferably at least approximately 50% by weight of natural material particles. In a preferred embodiment, the composite material comprises of at least approximately 20% by weight of plastic, preferably at least approximately 40% by weight of plastic, and more preferably at least approximately 50% by weight of plastic. In a preferred embodiment, the composite material comprises a contiguous plastic layer comprising included natural material particles.

The present invention also comprises a method of preparing natural material particles for making a composite material. According to a preferred embodiment the method comprises the steps of logging natural material; grinding logged natural material; screening ground natural material; and grinding screened natural material. In a preferred embodiment, the first grinding step comprises grinding the natural material to a maximum particle dimension of less than approximately 12 inches. In a preferred embodiment, the method further comprises a washing step before the second grinding step and/or a drying step before the second grinding step. According to a preferred embodiment, the second grinding step comprises grinding the natural material to a maximum particle size of less than approximately 0.5 inches. In a preferred embodiment, the method further comprises a chunking step before the first grinding step, a screening step additionally comprising a washing step, a flaking step before the second grinding step, and/or a sifting step after the second grinding step. A sifting step is useful for, but not limited to, producing material comprising a more uniform size.

The present invention also comprises a press method of making a composite material. In a preferred embodiment, the method comprises the steps of: providing a frame; loading natural material and plastic into the frame; and applying heat and pressure to the natural material and plastic in the frame. According to a preferred embodiment, the method further comprises a step of removing the composite material from the frame after the applying step, a step of inserting a forming box into the frame, and/or a step of adjusting the packing of the natural material and plastic before the applying step.

In a preferred embodiment, the applying step comprises applying heat to reach a temperature of at least approximately 300° F. and/or the applying step comprises applying a pressure of at least approximately 4 psig. In a preferred embodiment, the applying step comprises applying heat to reach a temperature of approximately 400° F. and/or the applying step comprises applying a pressure of approximately 8 psig.

The present invention also comprises an extrusion method of making composite material. According to a preferred embodiment, the method comprises the steps of: feeding natural material and plastic into an extruder; heating the natural material and plastic in the extruder; and extruding composite material comprising the natural material and plastic from the extruder. In a preferred embodiment, the extruding step comprises extruding composite material onto a film. In another preferred embodiment, the method further comprises a step of rolling extruded composite material between two rollers and/or a step of cooling extruded material.

The present invention also comprises a method of making composite material comprising the steps of: processing natural material; and making composite material comprising natural material and plastic wherein making comprises at least one method selected from the group consisting of press methods and extrusion methods.

A primary object of the present invention is to produce a wood and plastic composite material.

A primary advantage of the present invention is economy of preparation of wood and plastic raw materials and production of a composite material comprising the same.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention comprises a composite board and a method of making the same. Practice of particular preferred embodiments of the present invention enhances recovery of the grasslands and watershed of the Southwest United States when a scrub tree (such as a one-seeded juniper) is mixed with plastic and processed to create a quality product, e.g., water-resistant and rot-proof. In panel form, such high quality product are suitable for sign manufacturing, housing construction, marine construction and other purposes. The present invention also comprises other trees, such as, but not limited to, ponderosa pine.

Composite Material

The present invention comprises a composite material and a method of making the same. In general, the composite material of the present invention comprises natural material, for example, wood, and plastic. Wood includes, but is not limited to hard and soft wood trees such as Apache Plume; Ash, single-leaf; Bitterbrush; Cliffrose; Fendlerbush; Juniper, one-seed; Juniper, Rocky Mountain; Mahogany, curl-leaf; Mahogany, mountain; Mockorange; Ponderosa Pine and Mormon Tea. According to the present invention, natural material comprises wood including for example, material from a tree, not limited to, leaf material, branch material, trunk material, bark material, needle material and root material. Composite material comprising particles of such materials are preferred. Plastic includes, but is not limited to, polypropylene, polyethylene, and the like. According to a preferred embodiment, composite material of the present invention comprises at least 20% juniper wood and at least 20% plastic. Optional additives include colorants, uv protectorants, flame and fire resistants, and the like.

Figure 1A:
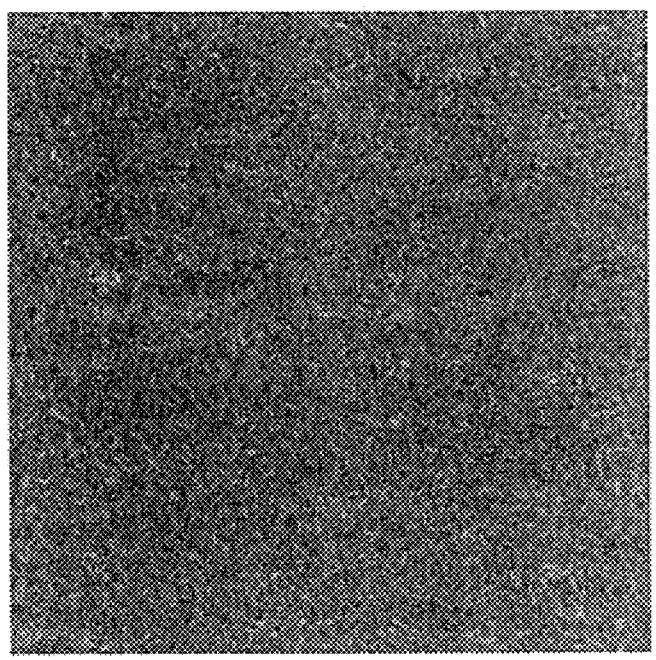
FIG. 1a is a scanned image measuring 3 inches by 3 inches of a cross section of a preferred embodiment of a composite board of the present invention.
Figure 1B:
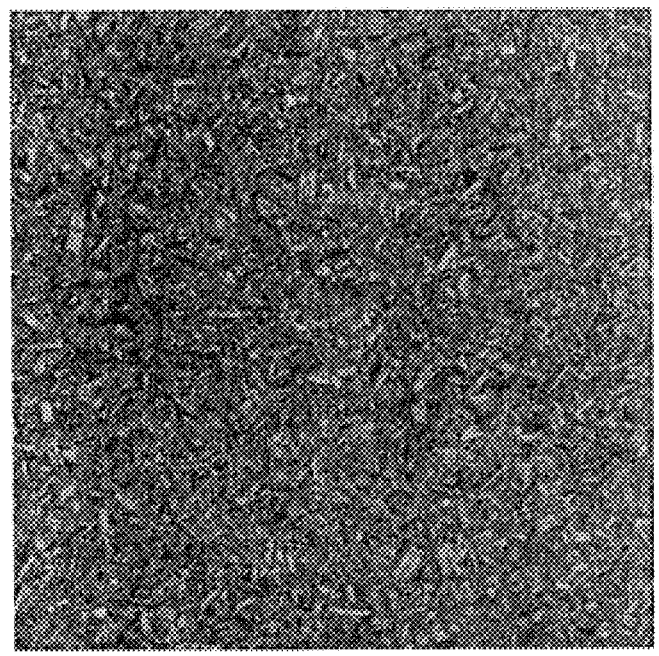
FIG. 1b is a scanned image measuring 3 inches by 3 inches of a cross section of a preferred embodiment of a composite board of the present invention.

Composite materials of preferred embodiments of the present invention are shown in FIG. 1a and FIG. 1b. As seen in FIG. 1a, the wood particles are generally elongated comprising a width that is approximately on the order of 1/32 inch or less. The wood particles used for production of this board were processed in a hammermill using a 1/32 inch screen. As shown, the wood particles are substantially evenly and substantially randomly distributed in the final product. FIG. 1b shows a composite material comprising wood particles having an average particle size greater than approximately 1/32 inch, for example, the particles comprise an average width greater than approximately 1/32 inch. FIGS. 1a and 1b are approximately 1:1 (to scale) scanned images having dimensions of 3 inches by 3 inches. Although both composite materials comprise preferred embodiments of the present invention, the composite material shown in FIG. 1a has advantages in comparison to the composite material shown in FIG. 1b as disclosed herein.

Method of Making Composite Material

Composite material of the present invention is manufactured via either press or extrusion methods. Wood ingredients are passed through a mill to achieve a desired particle size. Plastic is provided in a form suitable for mixing with the wood, for example, but not limited to, in the form of a fluid, pellets, flakes, or powder. In a preferred embodiment, composite material is manufactured comprising panel geometry, for example, but not limited to, panel geometry used in construction of buildings. In another preferred embodiment, composite material is manufactured comprising beam and/or post geometry, for example, but not limited to, beam and/or post geometry used in construction of buildings. Manufacture of such composite materials with such geometry is achieved through press and/or extrusion techniques. It is to be understood by one of ordinary skill in the art that the term "board" is used in a non-limiting sense. Therefore, the term "board" as used throughout this disclosure comprises panel and other geometry that are achieved through the press and extrusion methods disclosed within. A discussion of inventive press methods and inventive extrusion methods follows. Thereafter, inventive methods of wood preparation are discussed.

Press Methods

Press methods of the present invention rely on at least one press. Pneumatic, mechanical and/or hydraulic presses are suitable for the press method of the present invention. The inventive press methods of the present invention process wood/plastic mixtures into, for example, composite board.

Figure 2:
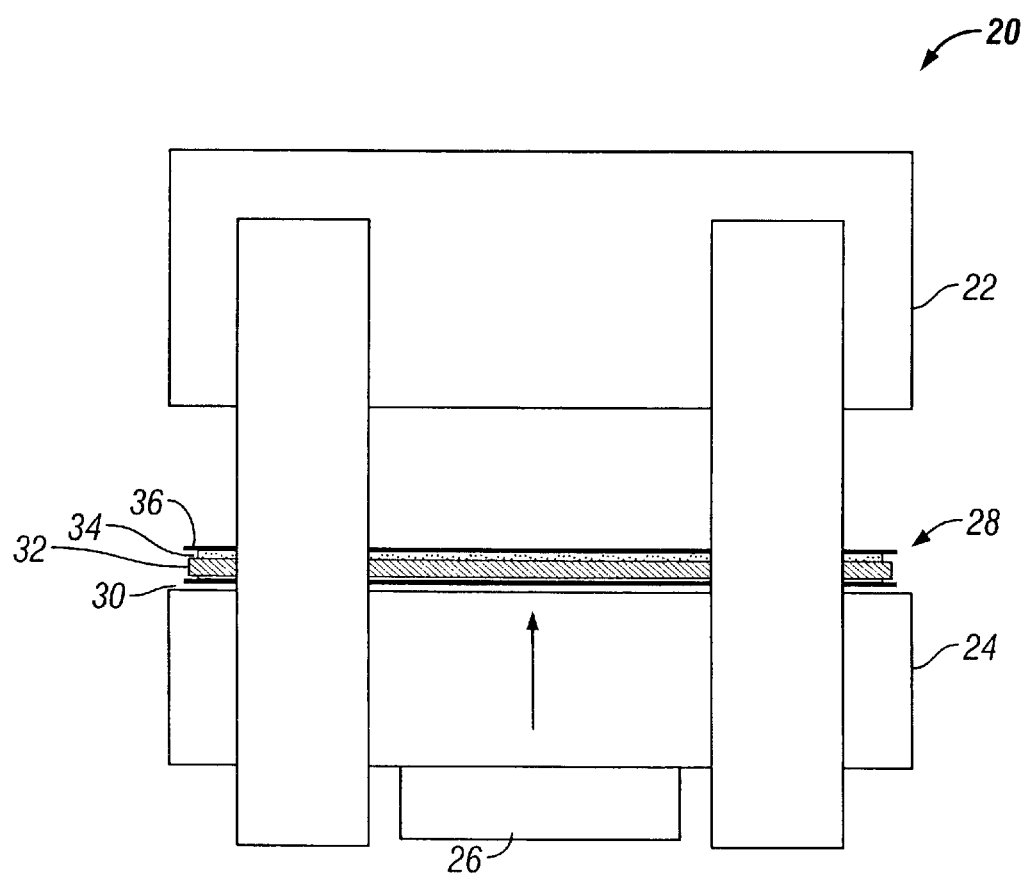
FIG. 2 is a drawing of a press apparatus for a preferred embodiment of the press method of the present invention.

A press apparatus 20 of a preferred embodiment of the present invention is shown in FIG. 2. This press comprises an upper platen 22 and a lower platen 24. The lower platen 24 is driven upward by a drive mechanism 26. Of course, a press comprising a moveable upper platen is also within the scope of the present invention. As shown in FIG. 2, a composite material assembly 28 is positioned between the upper platen 22 and the lower platen 24. The composite material assembly comprises a lower plate, called a caul plate, 30, a frame 32, a composite mat 34 and an upper caul plate 36. According to the present invention, at least one of the platens is heated to a temperature sufficient to melt the plastic component of the composite material. Heating of the at least one platen occurs optionally before or after engagement of the drive mechanism 26. In a preferred embodiment of the present invention, both platens are heated prior to application of pressure to the composite mat 34. In this preferred embodiment, the drive mechanism 26 drives the lower platen upwards 24 until the upper plate contacts the upper caul plate 36 and compresses the composite mat 34. The plastic component of the composite material mat 34 melts due to heat transferred to the mat 34 from the heated platens and disperses throughout the discontinuous wood phase. The composite material essentially forms a slurry of liquid plastic and wood particles. Typically, air (or other gas) exits the mat during this process or, alternatively, is compressed and trapped within the slurry. This slurry is typically of a density greater than that of the mat 34 and thus occupies a lesser volume than the mat. Indeed, the frame 32 is sized as to accommodate the volume of the slurry. After slurry formation, the slurry is cooled and upon cooling a relatively rigid composite product, e.g., a board, is formed.

Of course the rigidity of the final product depends on a variety of factors including thickness, type of plastic, ratio of wood to plastic, amount of gas entrained, pressure of entrained gas, whether an enforcing mesh, rods, bars or other enforcing material is incorporated into the mat or slurry. Rigidity is also controllable through use of exterior films. Exterior films such as, but not limited to, reflective and/or colored films are also useable and may optionally add rigidity to a final product. Films are optionally added before, during, or after application of pressure and/or heat.

As described supra, the press method of the present invention optionally uses a frame having an appropriate thickness. This frame supports and contains the wood/plastic material as it is heated and/or compressed. Therefore, the frame must withstand the temperatures and/or pressures associated with the press method. In a preferred embodiment, the press is constructed from a piece of metal, for example, a single piece of metal from which a center section is cut and removed. The cut section comprises any desired configuration, including, but not limited to, rectangular, round, arbitrary and configurations typically used by federal and state agencies for signs. In a preferred embodiment, the amount of composite material placed into the frame to form the mat and subsequently, the slurry, is calculated as to prevent overflow of material. Overflow occurs when the volume of the slurry exceeds that of the frame cut-out.

In a preferred embodiment, a "forming box" (a forming box is used to "form" or "lay up" the mat of wood and plastic) is placed inside the frame. The forming box is optionally marked with graduations such as an approximately 1 inch border and a red line every approximately half inch and a black line every approximately ¼ inch. The forming box allows for loading of the frame minimizing risk of composite material spilling over the edge of the frame. In general, before heating and/or compression, the composite material is less dense and therefore occupies a greater volume. Thus, a manner of containing the composite material during loading is helpful. A forming box comprising graduations allows for more accurate leveling of the composite material across the breadth of the frame.

In an alternative embodiment, a forming box comprising an adjustable lid is useful for practicing the press method of the present invention. In such an embodiment, the lid is adjusted to a predetermined height and wood/plastic composite material is introduced into the volume created by the press, the frame and the lid. Material is preferably introduced through at least one opening in the lid. In such processes, substantially uniform distribution of the wood/plastic material is preferred to ensure final product quality.

Of course, devices that assist in placing composite material within the frame are within the scope of the present invention. Such devices must account for the "powder-like" characteristics of the composite material that exists before heating. Techniques and equipment known in the art of powder handling are suitable for use with the present invention in loading the frame. Caution is required in the loading step, however, to avoid segregation of the wood and plastic. Techniques known in the art of powder handling include, but are not limited to, air transport, mechanical transport, and electromagnetic transport. For example, an aeromechanical conveyor is manufactured by Angus Powderflight Limited, Derbyshire, England UK. This aeromechanical conveyor is a powder transporting device consisting of a constant diameter tube containing a series of discs mounted at fixed intervals on a cable, and with a drive mechanism that can propel the discs through the tube at a velocity sufficient to cause turbulence within the powder and surrounding air. Additionally, no separation occurs when transferring powder blends, even where there are considerable variations in density and particle size. However, it is advisable to monitor metering when using such a system. Spiral conveyors are another example of conveyors that are suitable for loading the frame. Again, prevention of wood and plastic segregation is important to forming a high quality composite board.

In embodiments where loading does not also achieve leveling, an additional leveling step is helpful. Leveling is achievable through use of a trowel, screed or the like.

In instances where loading and/or leveling do not achieve a substantially uniform packing/density, a pre-press compression step is optionally helpful. Pre-press compression of the wood/plastic material is achievable through use of a board or boards that are placed onto of the loaded and leveled wood/plastic material. When a suitable packing/density is achieved, according to the press method of the present invention, the wood/plastic material is referred to as a mat. Next, the mat must be prepared for application of heat and/or pressure.

In embodiments comprising a forming box, the mat must first be prepared such that removal of the forming box does not substantially disturb the mat. To achieve this goal, a cover is used comprising a breadth smaller than that of the forming box. This cover is placed on top of the mat to ensure integrity of the mat edges during forming box removal. In an alternative embodiment, only corners of the mat are protected. For example, square and/or L-shaped plates are placed over the corners of the mat to ensure the mat's integrity while the forming box is removed. In another embodiment, the forming box comprises compression means whereby the sides of the forming box compress and then release such that a gap is created between the mat and the forming box. The presence of a gap helps to ensure mat integrity during removal of the forming box. After forming box removal, the additional frame, and/or frame-like elements, are removed from the mat. In an alternative embodiment, a plate that covers the entire mat is placed on top of the mat. In such an embodiment, the plate is not removed after removal of the forming box. In embodiments that do not comprise a plate as an additional frame, or the like, a plate is placed on top of the mat. This plate comprises physical properties sufficient to withstand the heat and/or pressure of the press.

Next, the press is heated to a temperature sufficient to melt the plastic. Once this temperature is reached, the press is engaged such that the press and the plate compress and/or heat the wood/plastic material. In a preferred embodiment, the press is heated to a temperature greater than approximately 300° F., and preferably approximately 360° F. or greater, and a pressure of greater than approximately 200 pounds per square inch is applied. In the press method of the present invention, the press is applied for a period of time. In a preferred embodiment, the press is applied for approximately 30 minutes. The heat and/or pressure are then decreased. Optionally, depending on the selected temperature schedule, a decrease may occur prior to expiration of the press application period. A decrease in temperature is referred to as cooling. In a preferred embodiment of the present invention, cooling occurs after an approximately 30 minute heating period. After cooling, the composite board is removed from the press.

In a preferred embodiment of the present invention, the press method comprises the following steps: providing a frame, loading the wood/plastic material into the frame, applying heat and/or pressure to the material in the frame, and removing the composite board from the frame. In alternative embodiments, the press method optionally comprises the steps of inserting a forming box into the frame, leveling the wood/plastic material in the frame, adjusting the packing/density of the wood/plastic material in the frame, forming a wood/plastic material mat in the frame, protecting edges and/or corners of the mat, removing the forming box from the frame, and/or placing a plate on top of the mat.

In another preferred embodiment of the present invention, heating comprises use of electromagnetic radiation, preferably of a frequency wherein the plastic component is lossy such that absorption of the radiation is maximized. In yet another preferred embodiment of the present invention, heating comprises induction heating.

EXAMPLE

Wood and plastic were mixed and placed in a frame positioned on a large format press. Heaters were used to reach a temperature of approximately 400° F. and airflow of the press was set to approximately 650 scfm with a plenum pressure of approximately 8 psig. The wood and plastic material was heated and compressed using the press. After cooling, the composite board formed through this press process was removed from the press.

Extrusion Methods

Extrusion methods rely on a mechanical device known as an extruder. In general, an extruder has an inlet for receiving raw materials and an outlet for processed material. Extruders often comprise a screw for conveying material from the inlet to the outlet. Some extruders comprise more than one screw, for example, a twin-screw extruder.

Figure 3:
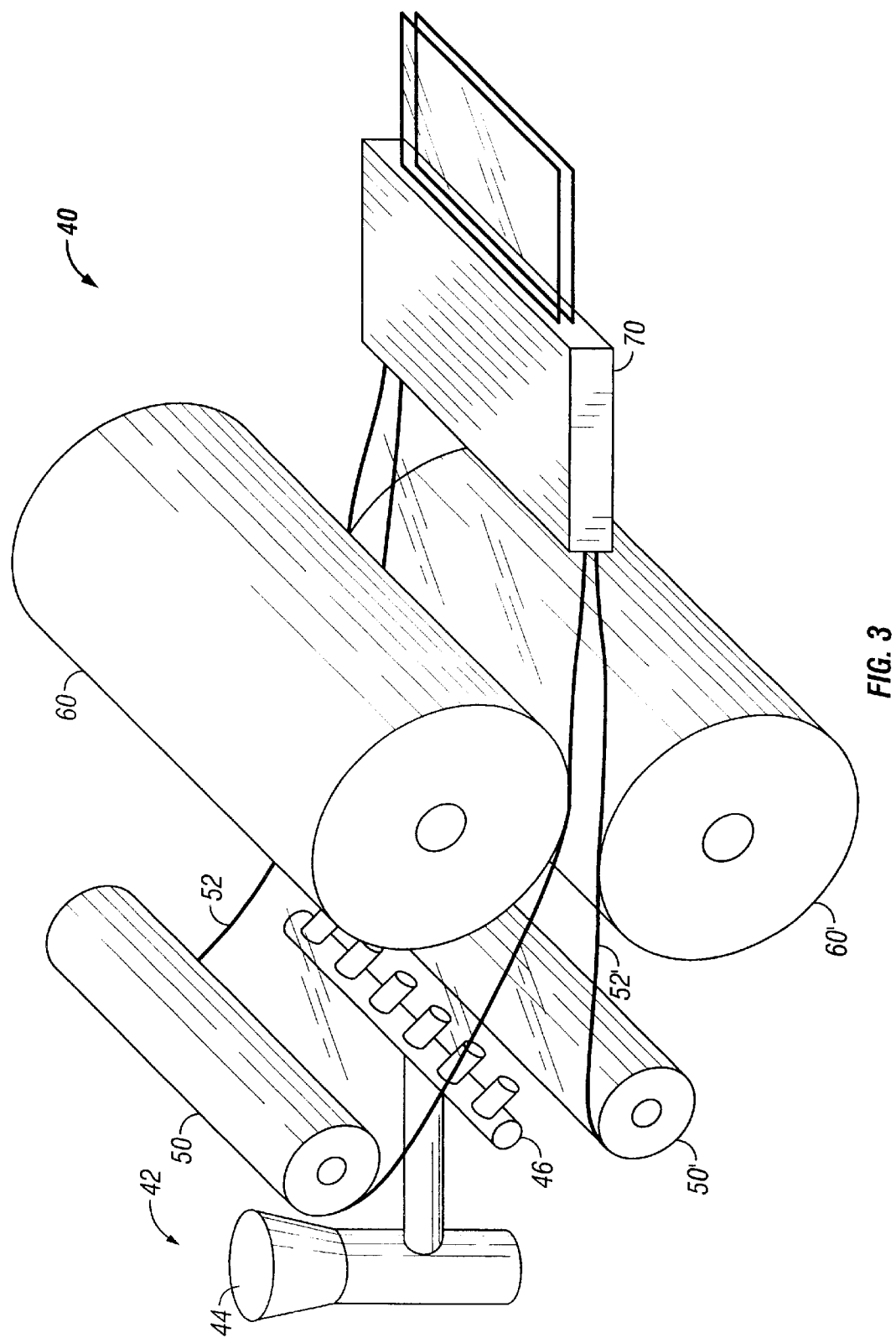
FIG. 3 is a drawing of an extrusion apparatus for a preferred embodiment of the extrusion method of the present invention.

The extrusion method of the present invention relies on at least one conventional extruder. A preferred embodiment of an extrusion method of the present invention is shown in FIG. 3. The method shown in FIG. 3 comprises an extrusion method apparatus 40. At a fore end of the extrusion apparatus is an extruder 42. The extruder 42 comprises an inlet 44 for feeding material and an outlet 46 for outputting extruded material. As known in the art of extrusion, the extruder is optionally heated or cooled at points, and/or zones, along the extruder, including the inlet and/or outlet. As shown in FIG. 3, the outlet 46 comprises a header comprising a plurality of sub-outlets. Alternatively, an outlet of the extrusion method of the present invention comprises at least one moving outlet that moves substantially horizontally over time. In either instance, the outlet, and/or sub-outlets, deposit outputted extruded material onto a surface.

In the particular embodiment shown in FIG. 3, a rolling film 52 that is stored on a film roller 50 provides a surface. Furthermore, in this particular embodiment, an upper rolling film 52 is used in conjunction with a lower rolling film 52' that is stored on a film roller 50'. It is understood, however, that the upper film is optional to the extrusion method of the present invention. Additionally, provision of a film surface is not limited to, for example, film stored on a roller. Film, and/or an alternative surface providing material, may come from a stack, a suitable fluid, a metal surface, an extruder and the like. For example, a layer of air having sufficient pressure is suitable for providing a "surface" onto which extruded material may be deposited, as is a layer of water. Regarding an extruder as providing a surface, those of ordinary skill in the art are familiar with co-extrusion methods wherein the same or an additional extruder is used to form a film that is optionally co-extensive with a core extrudate. For example, an extruder head that provides for at least one film while also providing for a core extrudate is within the scope of the present invention. When a film is extruded, it is known in the art to use a layer of air having sufficient pressure to support and/or cool the extruded film. When such an extrusion method apparatus of the present invention comprises extruded film, that film is optionally colored and/or mixed with other additives. In a preferred embodiment of the present invention, at least one side of the extruded composite material is coated with a film comprising a reflective material and/or a colored material. Alternatively, a reflective and/or colored material is added to the composite material before, during and/or after extrusion.

Once the extruded material, as shown in FIG. 3, has been deposited onto the rolling film 52, the deposited material and rolling film is transported to a roller drum 60. In this embodiment, the extrusion method apparatus comprises a lower roller drum 60' and an upper roller drum 60. In general, when two roller drums are used, at least one drum is positionable to adjust the gap between the two drums. In an alternative embodiment, only a single roller is used whereas in another alternative embodiment, a suitable surface is used for receiving film clad composite extrudate, a suitable surface comprises both low friction, "sliding" surfaces and high friction, "traction" surfaces. High friction, traction surfaces optionally comprise treads, spikes and/or barbs and the like for increasing friction and/or imparting surface indicia and/or holes. The extrusion method apparatus shown in FIG. 3 optionally applies force to at least one of the roller drums to evenly disperse and/or control the thickness and/or width of the extrudate. The roller drums of the extrusion method apparatus are also optionally temperature controlled for heating and/or cooling the extrudate and/or film, for example, one side may be heated while the other is cooled, both sides may be heated or cooled, or heating and/or cooling may occur periodically.

As shown in FIG. 3, at a distal end of the extrusion method apparatus 40, is a cooling unit 70. The cooling unit removes energy from the extrudate and/or film. In an alternative embodiment, comprising cooling rollers, a cooling unit is not necessary or can be used in conjunction with heating/cooling roller.

The extrusion method of the present invention is flexible in that composites are manufacturable in a variety of geometries. It is understood by one of ordinary skill in the art of extrusion that the extruder outlet 46 and other components are configurable to manufacture a variety of geometries. Furthermore, the extrusion method is optionally applicable to filing of molds.

In a preferred embodiment of the present invention, the extrusion method comprises the following steps: feeding composite material into an extruder, heating the composite material, and extruding the composite material from the extruder. In alternative embodiments, the extrusion method optionally comprises extruding composite material onto a film, rolling extruded material between two rollers, and/or cooling extruded material in a cooling unit.

EXAMPLE

An extruder was used to fill molds with the inventive composite. A Sterling single screw extruder (Sterling/APV Chemical Machinery, New Jersey) with a two inch screw diameter was used to extrude the inventive composite. The approximately 4 foot long extruder was operated with an electric motor having approximately 20 horsepower. A variable speed feed auger was used in conjunction with material vibrators to feed composite material into the extruder. Heaters were used, to maintain a temperature of approximately 520° F. The extruder was operated at a rate of approximately three cubic feet per hour. The extruder was outfitted with controllers for controlling the aforementioned variables. Of course, the selection of extruder operating temperature and rate depends on manufacturing criteria related to, for example, economics and composite product geometry. The extruder was used to manufacture composite beams comprising dimensions of approximately 4 inches by 4 inches and approximately 10 feet in length.

Wood Preparation Methods

In general, a process for making composite material of the present invention comprises several steps. These steps produce a wood material that is suitable for use in the aforementioned press and extrusion methods of the present invention. The inventive wood preparation methods that follow, optionally alleviate problems such as volatiles and moisture in the wood which can complicate, for example, extrusion processing.

In a preferred embodiment, the wood preparation method comprises four main steps: logging, grinding, screening and/or washing, and grinding. This preferred embodiment optionally comprises drying. According to this preferred embodiment, whole trees are logged. Whole trees comprise for instance, but are not limited to, one-seed Juniper and Ponderosa Pine and preferably comprise the aboveground portion of a tree and optionally comprise roots. Logging is performed, for example, with a tractor comprising a shear mechanism. Next, logged whole trees are ground to a maximum wood particle dimension of less than approximately 12 inches. Grinding is performed, for example, with a hog grinder, preferably to a maximum wood particle dimension of less than approximately 6 inches, and more preferably to a maximum wood particle dimension of between approximately 3 inches and approximately 5 inches. Next, the ground wood is screened and/or washed to remove debris, such as, but not limited to, dirt and sand. Depending on subsequent processing conditions, sand is potentially detrimental due to temperature and/or pressure related phase transitions to a liquid glass state. Screening and/or washing is performed, for example, with a device comprising a rotating screen drum and optionally at least one spray nozzle for spraying fluid, for example, gas and/or liquid. Next, the screened and/or washed ground wood is optionally dried. Drying is performed, for example, through use of a rotating drum dryer and forced air or alternatively through natural drying processes such as sun and/or air facilitated drying. The drying step comprises reducing moisture content of the ground, screen and/or washed wood to a moisture content of less than approximately 15% by weight, preferably to a moisture content of less than approximately 10% by weight and more preferably to a moisture content of less than approximately 5% by weight. Next, the wood is ground to a maximum particle size less than approximately 0.5 inches, preferably to a particle size less than 0.25 inches and more preferably to a particle size less than approximately 0.05 inches.

In another preferred embodiment, the inventive wood preparation method of the present invention comprises eight steps. A first step comprises logging in the field. Logging comprises removal of trees from their earthen base, which typically comprises substantially removing trees from their root systems.

A second step comprising chunking takes place in the field or optionally in a facility that is also designed for subsequent processing, i.e., a processing facility. A purpose of the chunking step is to reduce the size of the tree for facilitating transport to a grinder, such as, but not limited to, a hog grinder. Chunked trees are, under certain conditions, susceptible to degradation; therefore, time and storage conditions of chunked trees are factors that are useful in determining whether to perform chunking in the field or in a processing facility.

A third step comprising grinding is performed either in the field or in a processing facility. Grinding is performed using a grinder, such as, but not limited to, a hog grinder. Ground trees are, under certain conditions, susceptible to degradation; therefore, time and storage conditions of ground trees are factors that are useful in determining whether to perform grinding in the field or grinding in a processing facility. When trees are ground in the field, they are optionally transported to a processing facility, for example, via motorized vehicles and/or conveyors. For example, ground wood is optionally loaded into gaylords for delivery to a processing facility. Once at the processing facility, the gaylords are positionable on a hog grinder loader, which delivers material to the hog grinder. In a preferred embodiment of the present invention, a hog grinder is used to reduce chunked trees to pieces comprising dimensions less than approximately 5 inches and preferably to less than approximately 3 inches, more preferably to approximately ¾ inch by approximately ¾ inch by approximately 3 inch. The ground tree pieces are herein referred to as "chips."

A fourth step comprising washing and/or screening of chips is performed in a processing facility. In a preferred embodiment of the present invention, a hog grinder drops chips onto a conveyor for transport to a chip washer and screener. Purposes of washing and/or screening are to wash chips and to remove any debris, such as, but not limited to, sand, dirt, rocks and other foreign material from the chips. Of course, washing conditions and screening conditions are selected to facilitate further processing and to enhance the quality of the final product. For example, additives known to effect wood are optionally added to the washing solution, such additives include, but are not limited to, acids, bases, enzymes (e.g., cellulosic enzymes), gas concentrations and the like. Environmental conditions of the washing solution are also adjustable to promote overall efficiency. Such conditions include temperature and pressure. It is understood that the effect of additives and environmental conditions can be cumulative and/or synergistic and operate through physical and/or chemical principles. Furthermore, washing optionally comprises washing with a gas. Such an embodiment optionally comprises gas delivered at a pressure sufficient to remove debris.

A fifth step comprising flaking of washed and/or screened chips is performed in a processing facility. A purpose of flaking is to reduce the size of tree chips to a desired size. In a preferred embodiment, the desired size is less than approximately 2 inches, and more preferably to less than approximately 0.5 inch. Flaked tree chips are herein referred to as flakes.

A sixth step comprising drying of flakes is performed in a processing facility. A purpose of drying of flakes is to reduce flake moisture content. In a preferred embodiment, moisture content is reduced to approximately less than 20%, preferably to less than approximately 15%, and more preferably to less than approximately 10%. Drying is achievable by a variety of means, including, but not limited to, convection drying and solar drying. In a preferred embodiment, a gas fired rotary dryer is used. This rotary dryer is inclined by approximately 20 degrees, thereby defining a "high" end and a "low" end. This rotary dryer is also operable in a continuous manner. In this rotary dryer embodiment, flakes are fed into the high end and flakes emerge from the low end. In an alternative embodiment, a plurality of dryers are used wherein energy supplied to each dryer (e.g., energy for heat and/or rotation) are controllable and selected to achieve desirable end results, e.g., reduced drying time, reduced energy input, and/or higher product quality.

A seventh step comprising finish grinding is performed in a processing facility. A purpose of finish grinding is to reduce dried flakes to a desired size. In a preferred embodiment of the present invention, the desired size comprises a particle size less than approximately 0.25 inch and more preferably a particle size less than or equal to approximately 0.03125 inch.

An eighth step comprising sifting is performed in a processing facility. A purpose of sifting is to remove particles, or fines, from the processed material. The collected fines are useable as a facing material or fuel, or alternatively, discarded as waste. In a preferred embodiment, material exiting the sifting step is transported by a gas, such as, but not limited to, air and gases that reduce the potential for combustion. Transported material is immediately available for further processing or for storage.

Integration of Wood Preparation and Press and/or Extrusion Methods

Figure 4:
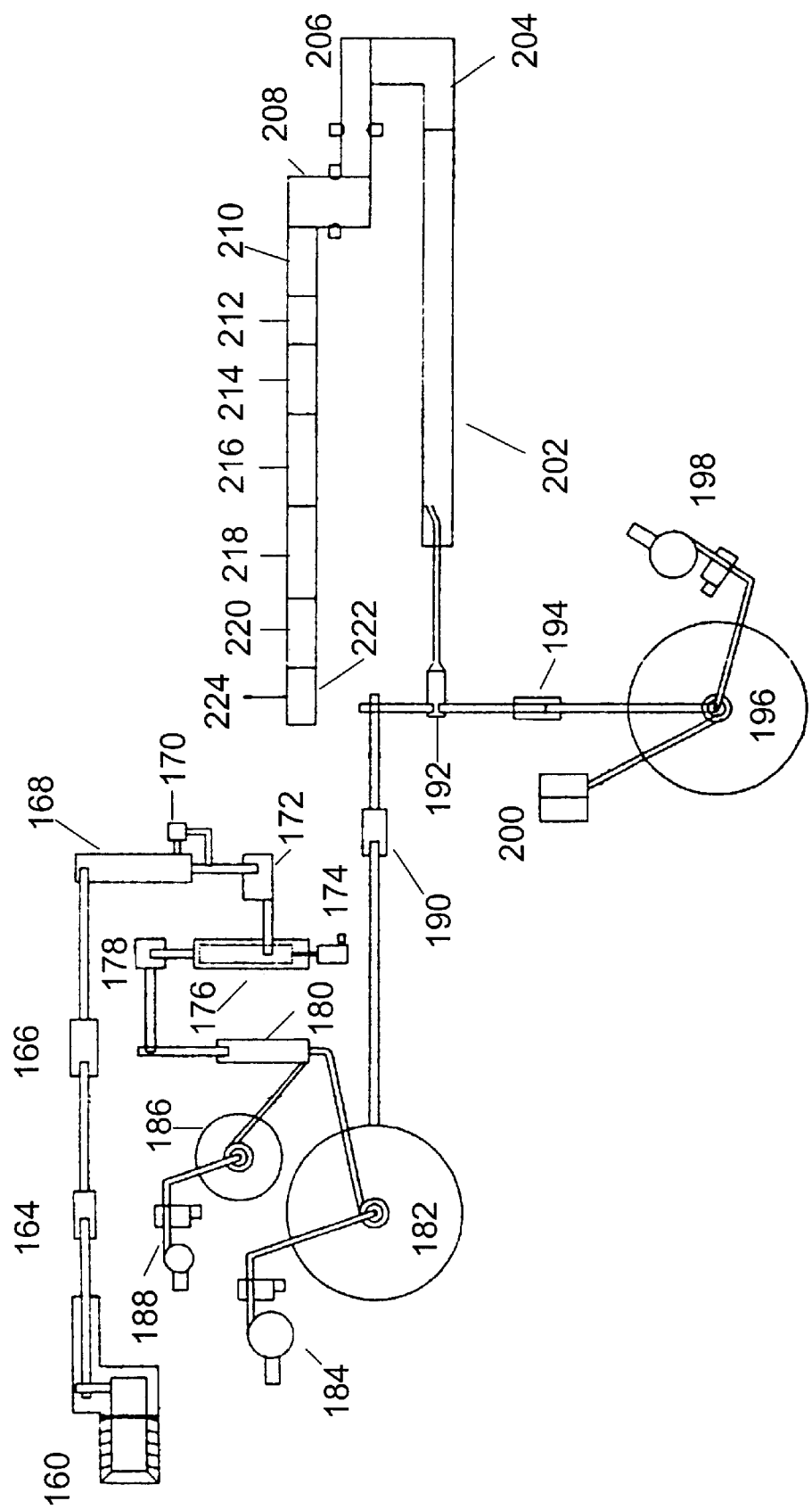
FIG. 4 is a drawing of a production process for a preferred embodiment of the present invention.

According to the present invention, the wood preparation methods and press and/or extrusion methods are combinable in a production process to produce an inventive composite product. A preferred embodiment of a production process is shown in FIG. 4. As shown in FIG. 4, a wood receiver 160 is used for receiving wood. Next, the wood is transported to a screen 164 for screening out undesirable larger pieces of wood. Once screened, the wood is transported to a reducer 166 for reducing the size of the screened wood. The reduced wood is transported to a washer and/or screener 168 that optionally comprises a re-chipper 170 for further reduction of screened wood. Next, the washed wood is flaked using a flaker 172. From the flaker 172, the wood is transported to a flake receiver 176 that optionally comprises a heater and/or dryer and/or a dust burner 174. Flakes are then transported to a grinder 178 for grinding and/or sizing of the wood. The ground wood is then transported to a sifter 180 for sifting fines from larger pieces of wood. Fines are transported to and stored in a fines receiver 186 while the larger pieces are transported to and stored in a processed wood receiver 182. The fines receiver and processed wood receiver optionally comprises filters 184, 188. The processed wood and/or fines are then ready for further processing and/or combination with plastic.

Plastic enters the production process through a plastic receiver 200. The plastic in the plastic loader is optionally transported to a plastic storage receiver 196 for storage and/or further processing. The plastic storage receiver 196 optionally comprises a filter 198.

Once the wood has been processed and/or stored, it is then transported to a measurement system 190, for example, a weigh station system and/or how measurement system. Once the plastic has been processed and/or stored, it is then transported to a measurement system 194, for example, a weigh station system and/or flow measurement system. The plastic and wood are transported to a blender 192 for blending plastic and wood. Blended plastic and wood are transported to a production line 202 that comprises a press and/or an extruder. The production line produces a final product or optionally comprises additional equipment for performing additional steps for producing a final product. For example, the production line optionally comprises an unloader and/or cooler 204; a trimmer and/or borer 206; an additional trimmer and/or borer 208; a transfer and/or inspection unit 210; a sander 212; an additional transfer unit and/or inspection unit 214; a paint unit 216, for example, for spray painting; an oven 218, for example, for curing paint and/or other material; a grade station 220; and/or a stacker 222, for stacking product. Product output from the production line is output generally at a product or stacked product output 224.

Example 1

A one layer composite panel, or board, of the present invention was manufactured. The panel comprised approximately 50% by weight of juniper and approximately 50% by weight of polypropylene. The juniper was processed with a hammermill to approximately 1/32 inch and dried to a moisture content of less than 1%. The panel comprised the following target characteristics: length of approximately 46 inches; width of approximately 46 inches; thickness of approximately 0.625 inches; specific gravity of approximately 0.95 and a total mass of 20,592 grams. A press temperature of approximately 195° C. was used together with a press time of approximately 30 minutes and a maximum gauge pressure of approximately 900 psi. A cooling time of approximately 15 minutes was used. The final panel had a mass of approximately 20,440 grams, a thickness of approximately 0.615 inches, and a specific gravity of approximately 0.96. Thus, the actual characteristics for specific gravity and thickness were within approximately 2% of the target characteristics.

Example 2

A one layer composite panel, or board, of the present invention was manufactured. The panel comprised approximately 50% by weight of Juniper and approximately 50% by weight of polypropylene. The juniper was processed with a hammermill to approximately 1/4 inch and dried to a moisture content of less than 1%. The panel comprised the following target characteristics: length of approximately 46 inches; width of approximately 46 inches; thickness of approximately 0.625 inches; specific gravity of approximately 0.95 and a total mass of 20,592 grams. A press temperature of approximately 195° C. was used together with a press time of approximately 30 minutes and a maximum gauge pressure of approximately 900 psi. A cooling time of approximately 15 minutes was used. The final panel had a mass of approximately 20,525 grams, a thickness of approximately 0.665 inches, and a specific gravity of approximately 0.89. Thus, the actual characteristics for specific gravity and thickness were within approximately 7% of the target characteristics.

Example 3

A one layer composite panel, or board, of the present invention was manufactured. The panel comprised approximately 50% by weight of Juniper and approximately 50% by weight of polypropylene. The juniper was processed with a hammermill to approximately 1/32 inch and dried to a moisture content of less than 1%. The panel comprised the following target characteristics: length of approximately 46 inches; width of approximately 46 inches; thickness of approximately 0.25 inches; specific gravity of approximately 1.15 and a total mass of approximately 9,970 grams. A press temperature of approximately 195° C. was used together with a press time of approximately 17 minutes and a maximum gauge pressure of approximately 1000 psi. A cooling time of approximately 15 minutes was used. The panel mass before application of the press was approximately 9,537 grams. The final panel had a mass of approximately 10,505 grams, a thickness of approximately 0.297 inches, and a specific gravity of approximately 1.02. Thus, the actual characteristics for specific gravity and thickness were within approximately 20% of the target characteristics.

Example 4

A three layer composite panel, or board, of the present invention was manufactured. The panel comprised approximately 50% by weight of Juniper and approximately 50% by weight of polypropylene. The juniper was processed with a hammermill to approximately 1/32 inch for panel faces and to approximately 1/4 inch for a panel core. The juniper particles were dried to a moisture content of less than 1%. The face material was divided approximately evenly and positioned to form two faces whereas the core material was substantially disposed between the face material. The panel comprised the following target characteristics: length of approximately 46 inches; width of approximately 46 inches; thickness of approximately 0.625 inches; specific gravity of approximately 0.95 and a total mass of approximately 20,592 grams. A press temperature of approximately 195° C. was used together with a press time of approximately 23 minutes and a maximum gauge pressure of approximately 1000 psi. A cooling time of approximately 20 minutes was used. The panel mass before application of the press was approximately 20,592 grams. One breathing cycle was used. The final panel had a mass of approximately 20,425 grams, a thickness of approximately 0.630 inches, and a specific gravity of approximately 0.94. Thus, the actual characteristics for specific gravity and thickness were within approximately 2% of the target characteristics.

Example 5

Whole juniper trees were chipped and the chips were put in a hammermill with an approximately 1/4 inch screen purchased from Montgomery Wards. Next, the chips processed using the 1/4 inch screen were re-ground using an approximately 1/32 inch screen that was placed in the hammermill. After this step, the ground chips were run through a dryer for 24 hours until the exit air was approximately 2% in moisture (from a start of approximately 8%). The dried wood was then mixed with an approximately equal weight of plastic and mixed for approximately 10 minutes. Next, the wood/plastic mixture was processed into a composite board using the inventive press method. The press method used a metal frame having an approximately 5/8 inch thickness. This metal frame was placed on a 1/4 inch metal caul plate. A "forming box" was placed inside the metal frame. The forming box was marked with an approximately 1 inch border and a red line every approximately half inch and a black line approximately every 1/4 inch. The wood/plastic mixture was then placed into the box and leveled accordingly using the black and red lines for guidance. The mixture was then compressed by hand to form a mat using boards having dimensions of approximately 18 inches by 18 inches. Next, four square pressing boards were placed temporarily in each of the four corners to prevent the mat from falling apart in the corners while the forming box was removed. After removal of the forming box, the four square pressing boards were removed. Next, an approximately 1/4 inch metal caul plate was placed on top of the mat and the press was heated to approximately 360° F. Once heated to temperature, the press was engaged and a pressure of approximately 320 pounds per square inch was applied for approximately 30 minutes. After approximately 30 minutes, the press was allowed to cool for approximately 20 minutes, after which time, the composite board was removed from the press. Alternatively, the composite board is removed to another station for cooling thereby eliminating the need to cool the press. This alternative facilitates throughput by eliminating the need for large temperature differential cycling of the press and providing for relatively constant temperature operation.

Example 6

The press or extrusion methods of the present invention are used to manufacture novel composite boards having thicknesses from approximately 1/8 inch to approximately 5/8 inch. Whole juniper and/or pine trees are used but is not limited to whole trees. The trees are chipped in the field and then brought to the processing plant. AT the processing plant, the chips are dried to a moisture content of approximately 5% or less. The dried chips are then processed using a hammermill with an approximately 1/32 inch screen. The wood is then mixed with an approximately equal weight of plastic, such as, polypropylene. The mixture is then heated, either by press or extruder, to a temperature of approximately 360° F. The mixture is allowed to cool thereby forming a waterproof composite board that resists rotting and decay. Such inventive composite boards are suitable for use as signs for federal and/or state agencies.

Example 7

As in Example 6, a composite board is manufactured using the press method of the present invention. An approximately 5 foot by 5 foot press is used to heat the wood/plastic mixture. Next, the wood/plastic heated mixture is transferred to a second cooling press where the cooled mixture forms a composite board.

Tests of Invention Composite Boards

Composite boards of the present invention were manufactured and tested. The test results show that the inventive thermoplastic/juniper composites appear are cost-effective candidates to replace the plywood substrate of signs, such as those used by the U.S. Forest Service. The advantages of the inventive composite materials are good moisture resistance, good edge nailing capability, competitive cost, and better durability, especially when exposed to porcupine populations, which presently eat a large number of the signs supplied.

Tests were performed to determine how much wood, particularly juniper wood, can be used as a component in juniper/thermoplastic composite materials of the present invention. A variety of inventive composite materials were subjected to a series of standard ASTM tests and the results were compared to published values of competing wood composite panel products.

The objectives of the series of tests were to determine:
1. bending strength and stiffness of the material;
2. nail and screw withdrawal capacity of the material;
3. thickness swell and linear expansion properties of the material;
4. moisture absorption properties of the material;
5. internal bond strength of the material; and
6. shear strength of the material.

In addition to the above listed tests, material was placed in the field to determine if porcupines will eat it.

Raw Material Description and Preparation

For purposes of the tests, wood comprised an approximately 20 foot diameter Juniper tree that included needles, branches, trunk, bark and limbs. Some of the trunk and limbs were processed in the field by grinding in a hammermill, the rest of the material was sent a processing facility where it was processed as in the field (limbs and trunks, typically known as cord material, cut to about three foot lengths). This material was further processed as disclosed below.

Juniper Cord Material Preparation

The cord material was processed by three methods:

Method 1: The field material was chopped in a hammermill. It was then flaked at Washington State University's (WSU) Wood Materials and Engineering Laboratory (WMEL) using a Pallmann rotary blade grinder.

Method 2: The material was chipped and then flaked at Washington State University's (WSU) Wood Materials and Engineering Laboratory (WMEL) using a chipper and a Pallmann rotary blade grinder.

Method 3: The material was ground through a 7/8" screen using a Filone grinder. It was then flaked at Washington State University's (WSU) Wood Materials and Engineering Laboratory (WMEL) using a Pallmann rotary blade grinder.

Plastic Geometry and Quantity

All of the formulations tested comprised low density polyethylene (LDPE) film mixed with juniper furnish material in an approximately 50 percent by weight LDPE film and an approximately 50 percent by weight juniper furnish. The film was a nominal 1/4 inch grind in the formulation. A sieve analysis was conducted on the plastic material to determine the exact particle size distribution and approximate average particle size. The 50 percent plastic level was chosen because preliminary moisture response tests indicated that this level would be required to make a superior exterior board substrate.

Final Density

Target density for all samples in Test Series 1 was 50 pcf. All samples were pressed to stops in the consolidation press. Nominal thickness was approximately 1/2 inch.

Composite Formulations

The following board formulations were tested in this test series:

Board 1A: 50% juniper field grind (unsifted), approximately 0.015" thick and 50% PE approximately 1/4" grind.
Board 1B: 50% juniper field grind, approximately 0.015" thick, sifted to remove approximately 1/4" minus, and 50% PE approximately 1/4" grind.
Board 2A: 50% juniper approximately 1/2" chips, approximately 0.015" thick, sifted to remove fines, and 50% PE approximately 1/4" grind.
Board 2B: 25% juniper approximately 1/2" chips flaked to approximately 0.015" thick, 25% juniper approximately 3/8" grind chips flaked to approximately 0.015", and 50% PE approximately 1/4" grind. All juniper material was sifted to remove the fines.
Board 2C: 15% juniper approximately 1/2" chips flaked to approximately 0.015"; 20% juniper approximately 3/8" chips flaked to approximately 0.0015" 15% juniper approximately 1/4" chips flaked to approximately 0.015", and 50% PE approximately 1/4" grind. All juniper furnish was sifted to remove the fines.
Board 3A: 16% juniper approximately 7/8" Filone grind flaked to approximately 0.015" and sifted to isolate approximately 1/2" chips, 34% juniper approximately -continued

| |
|---|
| 7/8" Filone grind flaked to approximately 0.015" and sifted to isolate approximately 3/8" flakes, and 50% PE approximately 1/4" grind. |

Performance Test Equipment and Procedures

All of the samples were formed on a PRESSAIRE™ large format press (24"×54") (Engineered Composites, Boise, Id.). Physical property tests were conducted at a research facility in Boise, Id. During the pressing process, the core temperature was recorded using a Type 3 thermocouple whose signal was processed by a data acquisition board. Plenum air pressure was measured using an Omega P 3031015G5V electronic sensors that have their signals processed by the data acquisition hardware. Airflow was measured using an Omega FLR871 0-SC electronic air flow meter. The set point for the heaters was approximately 420° F., the airflow was set at approximately 650 scfm, and the plenum pressure was approximately 8 psig. Platen closure rate was approximately 3/8" per minute.

All weights were measured by an electronic scale accurate to approximately 0.01 pounds. Bulk density was determined by placing the unconsolidated fluff mixture into a one cubic foot container and weighing it. All thickness measurements were made using a Triton Micrometer accurate to approximately 0.001 inches. Wood flake moisture content was measured using a CompuTrac Moisture Meter accurate to approximately 0.1 percent.

Sieve analysis was done on a Tyler RX-86 sieve shaker. The Tyler mesh numbers reported herein correspond to the following sieve openings: #5 is approximately 0.157 inch; #8 is approximately 0.0937 inch; #14 is approximately 0.0469 inch; and #20 is approximately 0.0331 inch. Weights for the sieve analysis were measured on a Mettler balance accurate to approximately 0.1 gram.

All structural tests were conducted on a Universal Test Machine using a BLH LP1O 10 k load cell and a BLH LCP1O digital readout recording device. All deflections were measured using a dial indicator accurate to approximately 0.001 inches. All tests performed followed the American Society for Testing and Materials (ASTM) D1037 test methods listed below:

| Static Bending | |
|---|---|
| Test Reference: | ASTM D1037-Section 11–20 |
| Number of Samples per each formulation: 9 | |
| Sample Size: | ½" × 3" × 13" |
| Span: | 11" |

| Nail Withdrawal | |
|---|---|
| Test Reference: | ASTM D1037-Section 47–53 |
| Number of Samples per each formulation: 5 | |
| Sample Size: | ½" × 3" × 6" |

| Water Absorption and Thickness Swell | |
|---|---|
| Test Reference: | ASTM D1037-Section 100–106 |
| Number of Samples per each formulation: | 4 |
| Sample Size: | ½" × 6" × 6" |

| Linear Expansion | |
|---|---|
| Test Reference: | ASTM D1037-Section 107–110 |
| Exception: | Substitute Section 104 (24 hr immersion) for Section 109 (90% relative humidity) |
| Number of Samples per each formulation: | 5 |
| Sample Size: | ½" × 3" × 12" |

| Internal Bond | |
|---|---|
| Test Reference: | ASTM D1037-Section 28–33 |
| Number of Samples per each formulation: 5 | |
| Sample Size: | ½" × 2" × 2" |

| Edgewise Shear | |
|---|---|
| Test Reference: | ASTM D1037-Section 136–142 |
| Number of Samples per each formulation: | 5 |
| Sample Size: | ½" × 3½" × 10" |

Sieve Analysis Results

The results of the sieve analysis for particle distribution and approximate average particle size are shown in FIGS. 5 through 10. The average particle size is not based on the total number of particles but rather it is based on the weight percentage of the material retained in each sieve tray in relation to the total sieved material weight. In practice a sieve retains particles greater than its associated mesh size. Sieve results, as shown in FIGS. 5 through 10 are also amenable to analysis by standard statistical measures. For example, it is known in the art to calculate geometric mean diameter and geometric standard deviation from sieve data. Therefore, the materials of the present invention are optionally characterizable by geometric mean diameter and geometric standard deviation. In general, a geometric mean is given by the nth root of the product of "n" observations. For example, the geometric mean diameter of a sieve, or bin, is the square root of the product of lower and upper sieve size. A program to calculate geometric mean diameter and geometric standard deviation from sieving results can be obtained from Dr. Tim Herrmann, Department of Grain Science, Kansas State University, Manhattan, Kan. and is hereby incorporated by reference.

Figure 5:
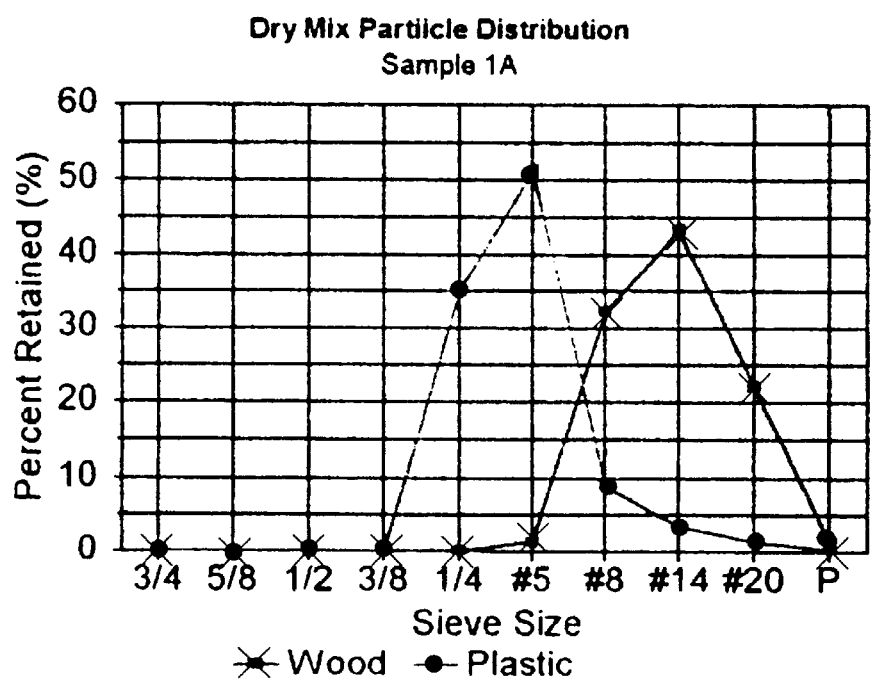
FIG. 5 is a plot of retained material versus sieve size for a wood and plastic blend of a preferred embodiment of the present invention.
Figure 6:
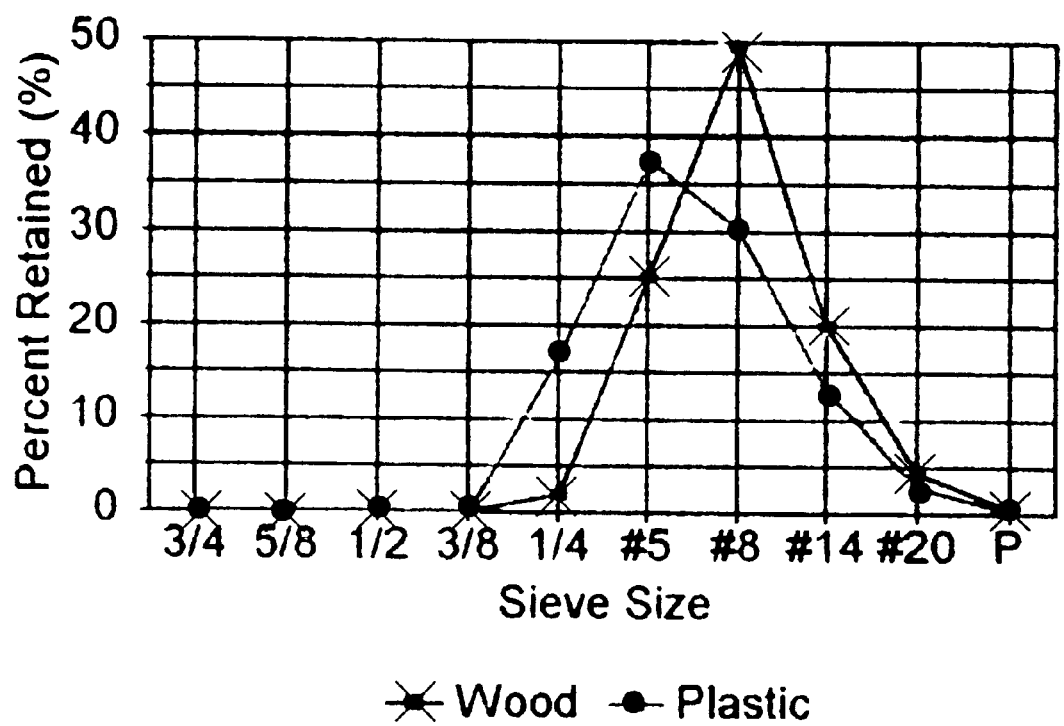
FIG. 6 is a plot of retained material versus sieve size for a wood and plastic blend of a preferred embodiment of the present invention.
Figure 7:
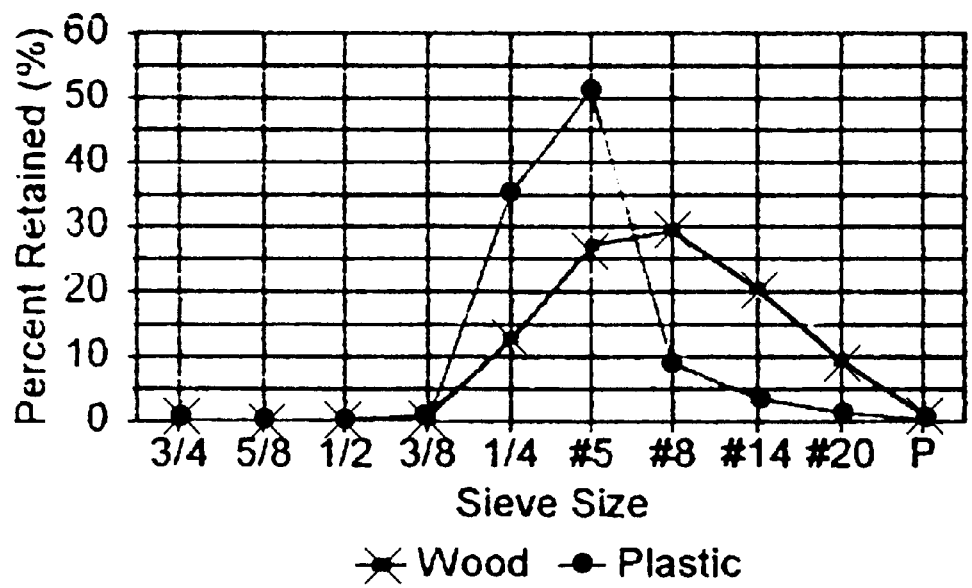
FIG. 7 is a plot of retained material versus sieve size for a wood and plastic blend of a preferred embodiment of the present invention.
Figure 8:
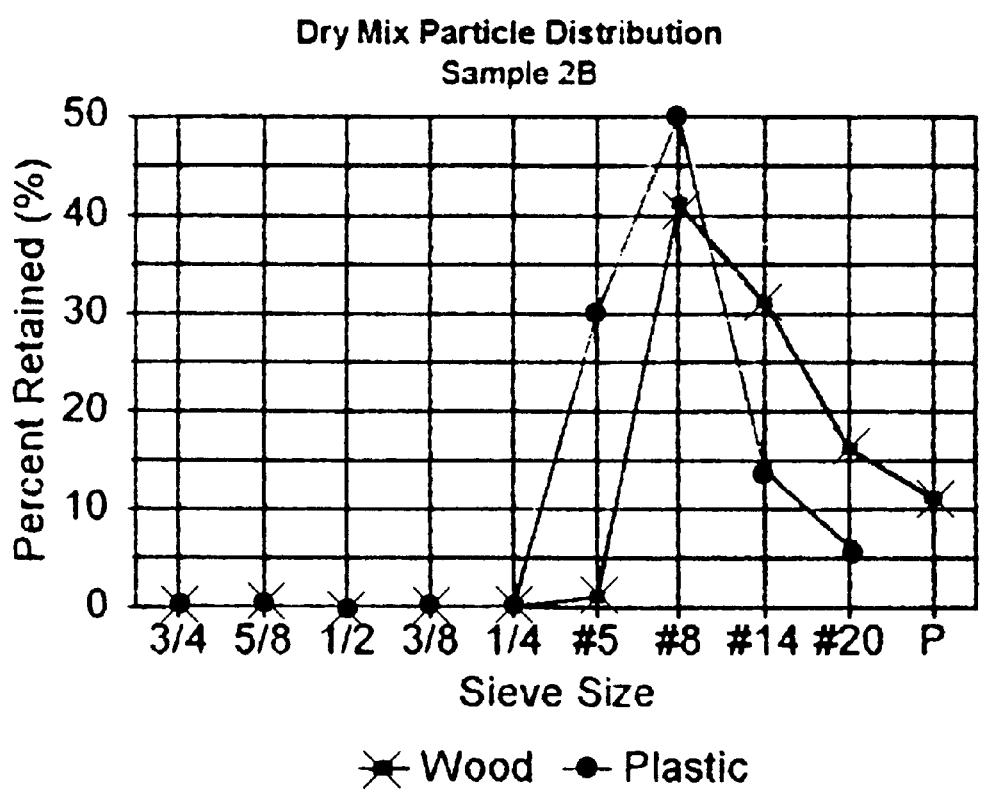
FIG. 8 is a plot of retained material versus sieve size for a wood and plastic blend of a preferred embodiment of the present invention.
Figure 9:
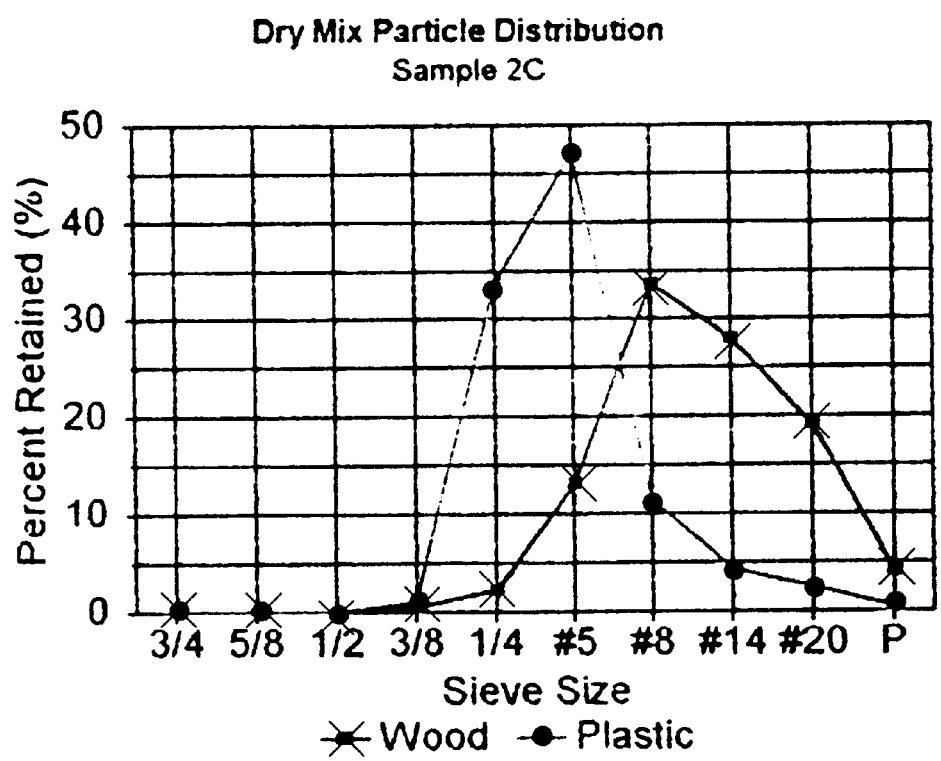
FIG. 9 is a plot of retained material versus sieve size for a wood and plastic blend of a preferred embodiment of the present invention.
Figure 10:
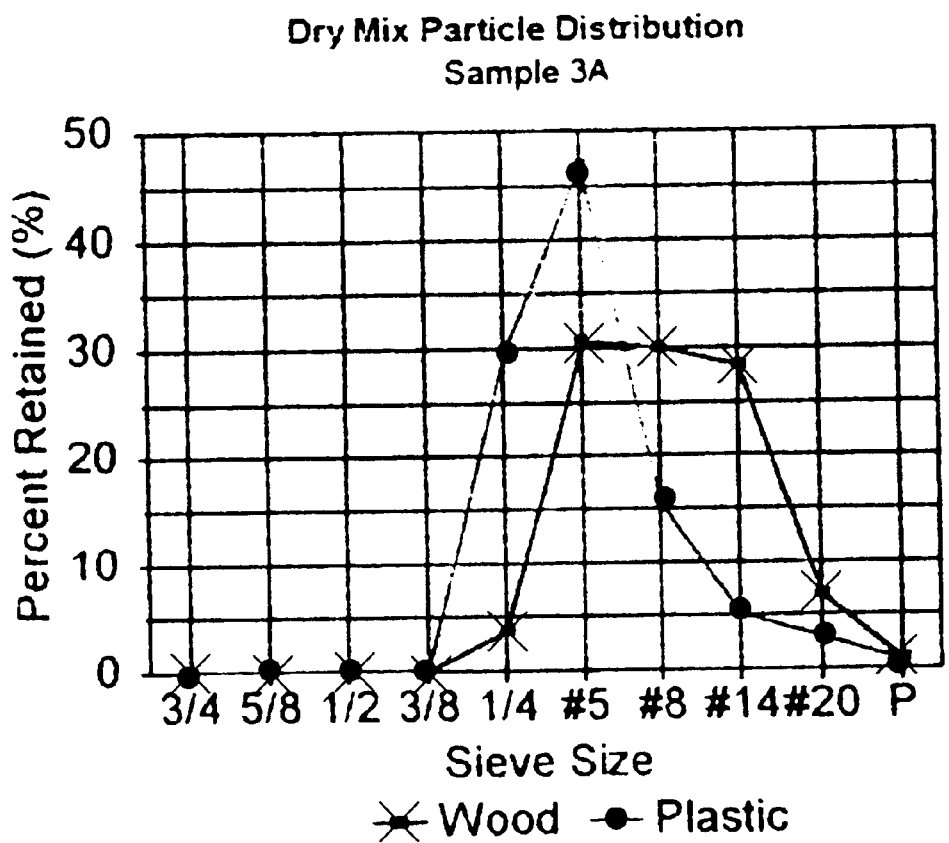
FIG. 10 is a plot of retained material versus sieve size for a wood and plastic blend of a preferred embodiment of the present invention.
Figure 11:
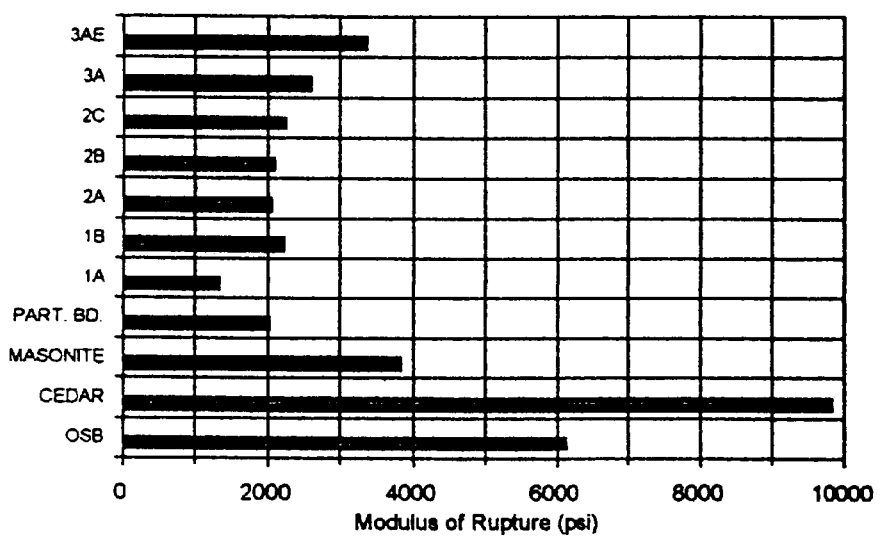
FIG. 11 is a graph of bending strength comparing various materials.
Figure 12:
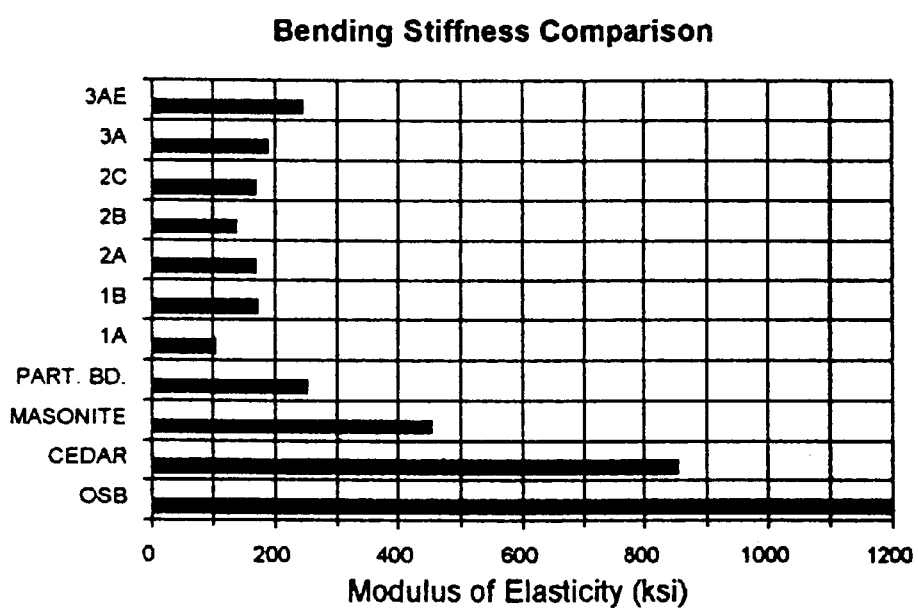
FIG. 12 is a graph of bending stiffness comparing various materials.
Figure 13:
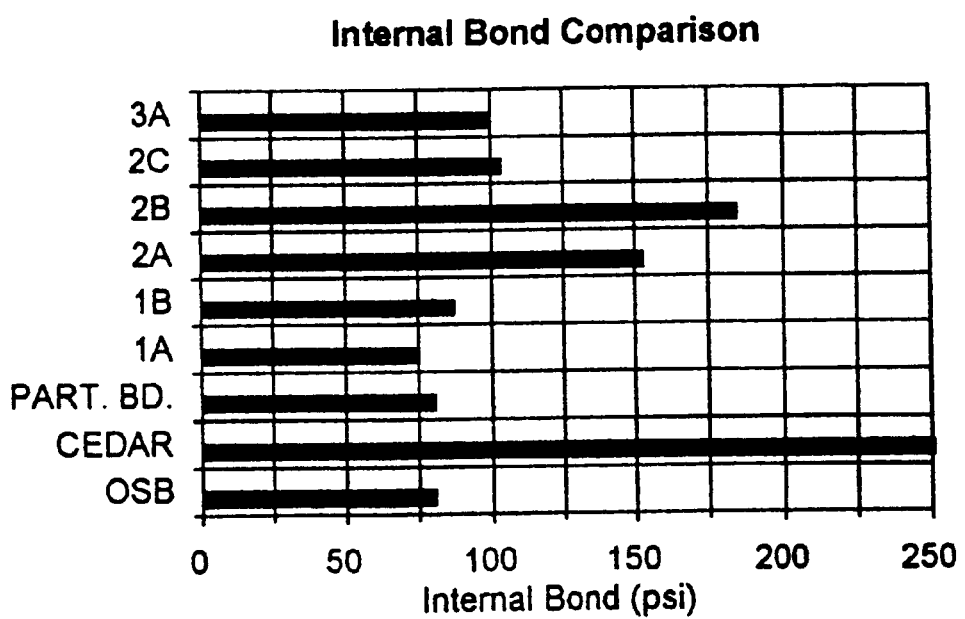
FIG. 13 is a graph of internal bond strength comparing various materials.
Figure 14:
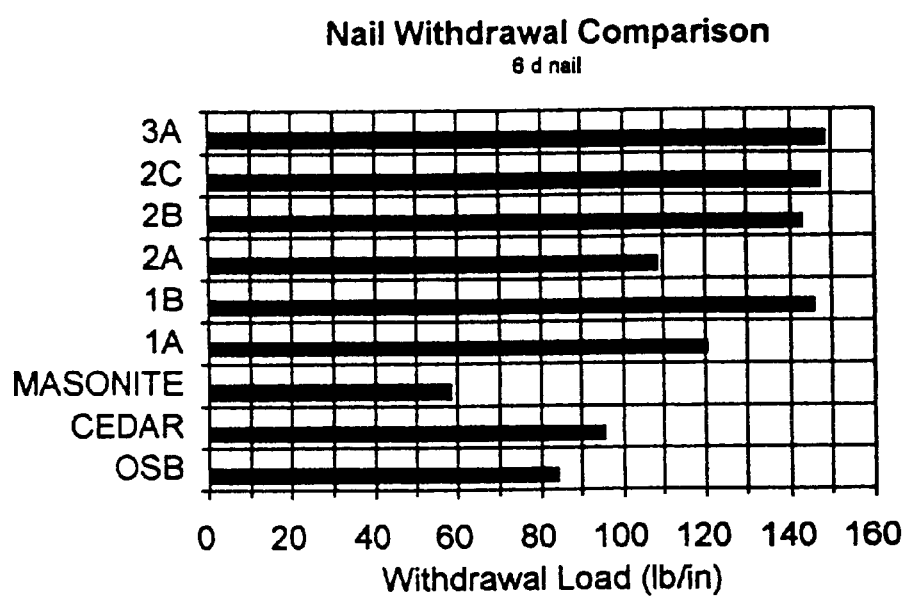
FIG. 14 is a graph of nail withdrawal strength comparing various materials.
Figure 15:
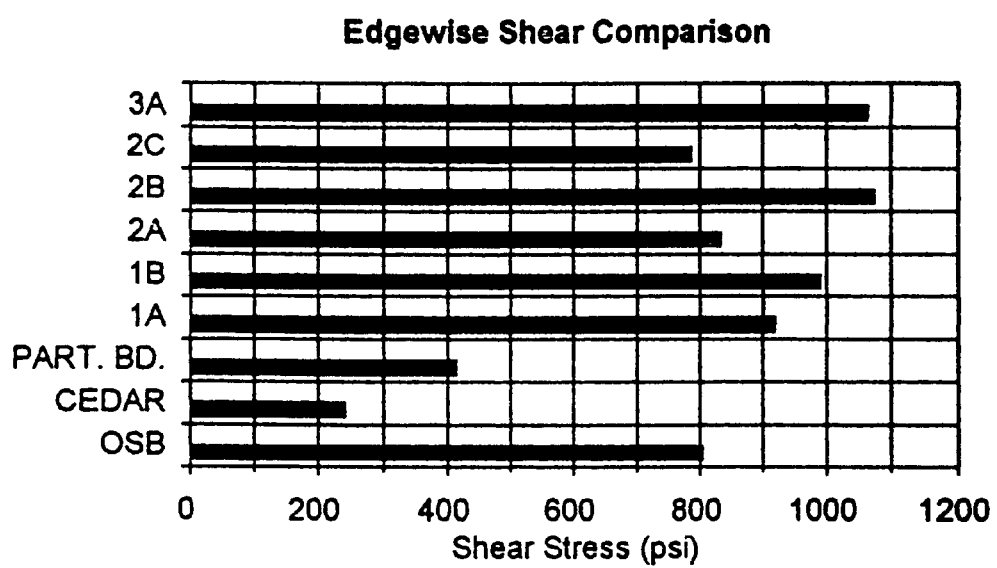
FIG. 15 is a graph of edgewise shear comparing various materials.
Figure 16:
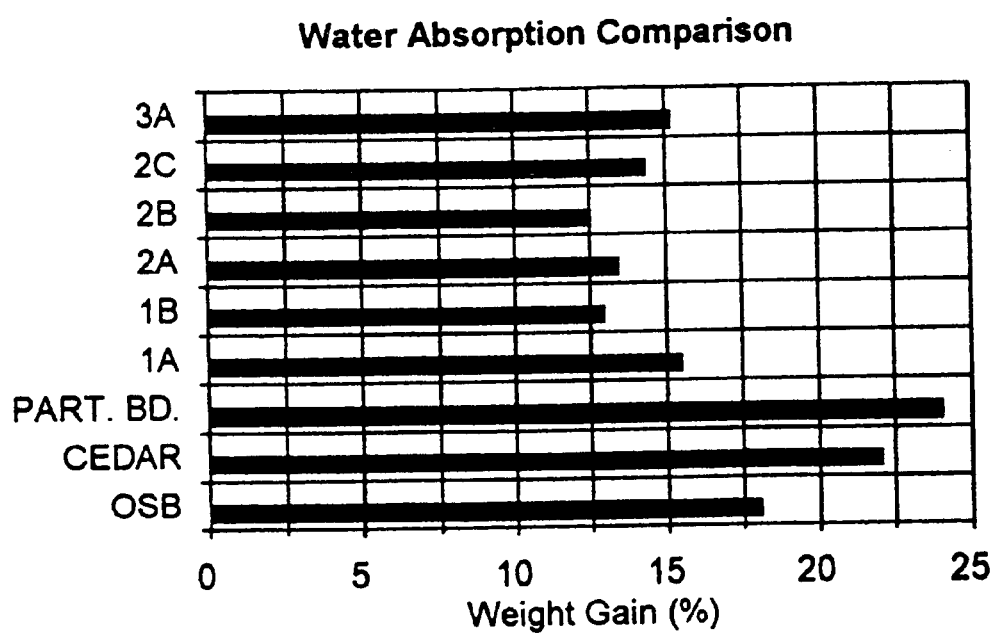
FIG. 16 is a graph of Water absorption comparing various materials.
Figure 17:
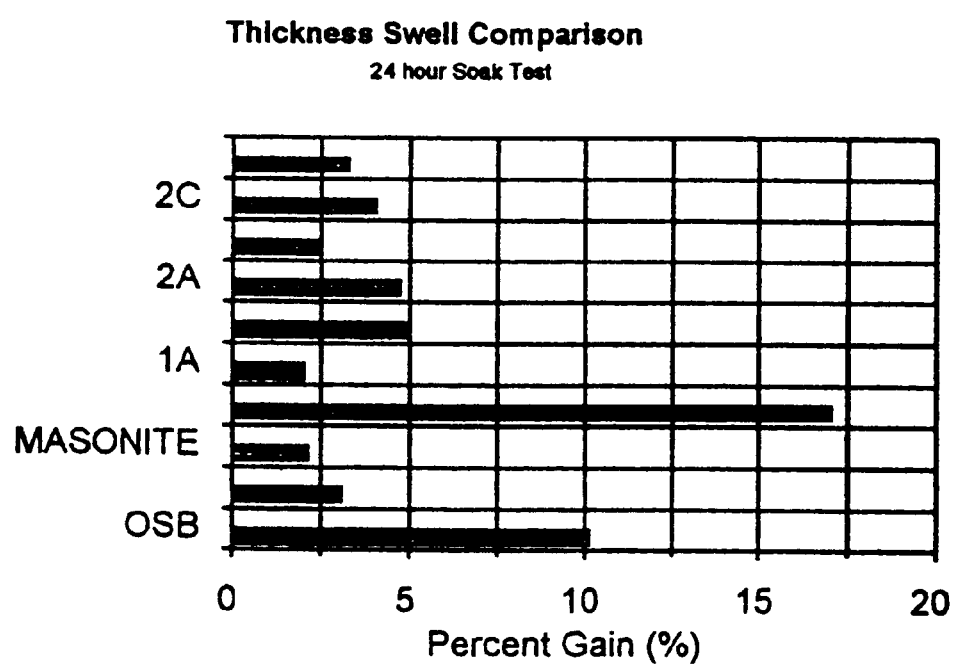
FIG. 17 is a graph of thickness swell comparing various materials.
Figure 18:
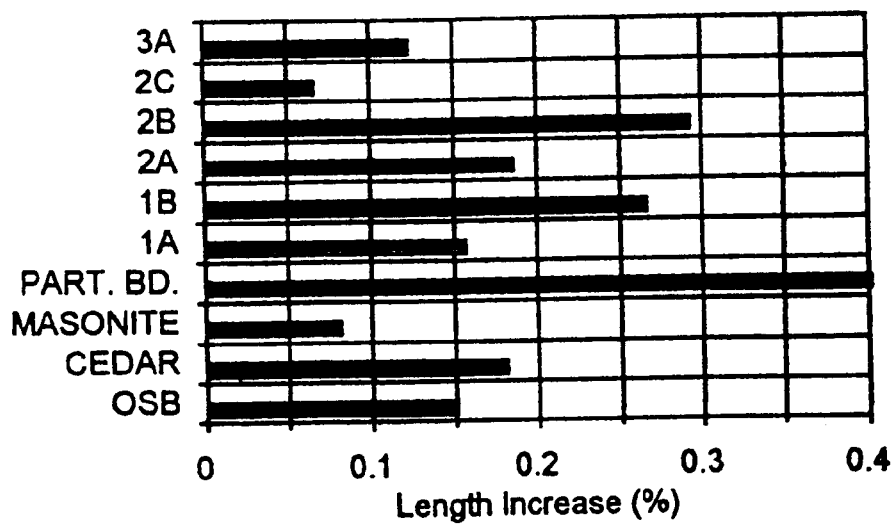
FIG. 18 is a graph of linear expansion comparing various materials.

FIG. 5 is a plot of retained material versus sieve size for the wood and plastic blend of Board 1A. Board 1A was formed from plastic having a particle size distribution comprising an average particle size of between approximately 0.25 inch and approximately 0.157 inch and wood having a particle size distribution comprising an average size between approximately 0.0937 inch and approximately 0.0469 inch. FIG. 6 is a plot of retained material versus sieve size for the wood and plastic blend of 1B. Board 1B was formed from plastic having a particle size distribution comprising an average size of between approximately 0.25 inch and approximately 0.157 inch and wood having a particle size distribution comprising an average size between approximately 0.1570 inch and approximately 0.0937 inch. FIG. 7 is a plot of retained material versus sieve size for the wood and plastic blend of 2A. Board 2A was formed from plastic having a particle size distribution comprising an average size of between approximately 0.25 inch and approximately 0.157 inch and wood having a particle size distribution comprising an average size between approximately 0.1570 inch and approximately 0.0937 inch. FIG. 8 is a plot of retained material versus sieve size for the wood and plastic blend of 2B. Board 2B was formed from plastic having a particle size distribution comprising an average size of between approximately 0.1570 inch and approximately 0.0937 inch and wood having a particle size distribution comprising an average size between approximately 0.1570 inch and approximately 0.0469 inch. FIG. 9 is a plot of retained material versus sieve size for the wood and plastic blend of 2C. Board 2C was formed from plastic having a particle size distribution comprising an average size of between approximately 0.25 inch and approximately 0.157 inch and wood having a particle size distribution comprising an average size between approximately 0.1570 inch and approximately 0.0469 inch. FIG. 10 is a plot of retained material versus sieve size for the wood and plastic blend of 3A. Board 3A was formed from plastic having a particle size distribution comprising an average size of between approximately 0.25 inch and approximately 0.157 inch and wood having a particle size distribution comprising an average size between approximately 0.25 inch and approximately 0.0469 inch.

According to the present invention, a particle size distribution is not limited to, for example, a Gaussian distribution, and comprises modal and/or skewed distributions. An approximate average size is determinable from any type of particle size distribution.

Results of Performance Tests

The results of the experiments are represented in Table 1.

simulate between approximately 3 and approximately 5 years of environmental exposure.

All of the samples tested that survived the 1000 hour exposure demonstrated thickness swell increases in the 0.1%–6% range. The five samples that did not last that long tended to show signs of large amounts of surface fiber pop, discoloration, some delamination, and relatively large thickness swell (10–20%). The thermoplastic cellulose samples tested intentionally had a large proportion of them formulated with PVC siding material or PVC wire stripping material. This was done because PVC thermoplastic is known to have very good ultra-violet light resistance. The investigators felt that by using this plastic we would be able to better discern the effect of changes in fiber geometry, species, and etc. In retrospect this was a mistake because PVC also has one of the highest melting points of the thermoplastics tested. Inspections made after the exposure using a stereoscope revealed that these PVC composites did not achieve full liquefaction at the time of composite manufacture. Consequently, the results of the PVC formulations are somewhat misleading, because complete bonding of the wood and plastic did not occur before the samples were exposed to the elements.

As mentioned supra, these tests demonstrate that composites made with polyethylene as the thermoplastic binder perform very well in spite of the fact that this plastic has very low ultraviolet resistance. These results demonstrate that the inventive composites are suited for applications where UV exposure is a concern.

The following ratings were used to judge the various samples:

Discolor:

1—complete discoloration of the wood

2—no noticeable discoloration

Surface Pop:

5—no noticeable surface pop of the cellulose fibers

4—very slight release of surface fibers

3—release of about 40% of the surface fibers

2—release of more than 40% of the surface fibers

1—substantial release of surface fibers, delamination and/or less than 1000 hours of exposure.

TABLE 1

Test data comparison between juniper furnish/thermoplastic composite boards

| Sample Board | Ave. Density (pcf) | Ave. MOR (psi) | Ave MOE (ksi) | Ave. Internal Bond (psi) | Ave Nail Pull-out (lbs/in) 6d nail | Ave. Screw Pull-out (lbs/in) Drywall | Ave. Edgewise Shear (psi) | Ave. Water Absorption (%) | Ave. Thickness Swell (%) | Ave. Linear Expansion (%) |
|---|---|---|---|---|---|---|---|---|---|---|
| 1A | 49.2 | 1321 | 101 | 75 | 120 | 457 | 917 | 15.4 | 1.9 | 0.156 |
| 1B | 47.2 | 2183 | 171 | 87 | 145 | 522 | 985 | 12.9 | 4.8 | 0.266 |
| 2A | 44.8 | 2024 | 165 | 152 | 108 | 484 | 831 | 13.3 | 4.6 | 0.185 |
| 2B | 45.8 | 2082 | 135 | 184 | 142 | 503 | 1073 | 12.5 | 2.4 | 0.293 |
| 2C | 46.7 | 2225 | 165 | 103 | 147 | 493 | 782 | 14.3 | 4.0 | 0.066 |
| 3A | 48.8 | 2568 | 185 | 99 | 148 | 565 | 1060 | 15.1 | 3.2 | 0.122 |

Weatherometer Tests

Table 2 summarizes the results of weatherometer testing of agricultural fibers combined with thermoplastic. The ultra-violet light exposure was approximately 1000 hours combined with cyclic moisture conditions; it is suppose to Swell %:

Calculated thickness swell based on average of four readings before and after exposure. The swell % rating is only used to rank the samples in the subject grouping.

TABLE 2

Weather Test Results.

| Number | Plastic | Wood | Color/Rating | Surface/Rating | Swell %/Rating | Overall Rating |
|---|---|---|---|---|---|---|
| 27 | 50% PE | 3/16" Grind Filone Juniper | 1 | 4 | 0.8%/6 | 11 |
| 28 | 50% PE | Hammermill Chipper Sagebrush | 1 | 4 | 0.6%/7 | 12 |
| 29 | 50% PE | 50% Pine Sawdust | 1 | 3.5 | 1.3%/5 | 9.5 |
| 49 | 48% HDPE, 2% Coupling Agent | 50% 1/4" Grind Sifted Peanut Hulls | 1 | 3 | 2.9%/4 | 8 |
| 51 | 48.5% PVC Wire Stripping Material, 1.5% Coupling agent | 3/8" Filone Grind Wheat Straw | 1 | 1 (741 hrs.) | 21%/1 | 3 |
| 52 | 48.5% PVC wire stripping material, 1.5% Coupling Agent | 1/4" Grind Almond Shells | 1 | 2.5 | 6.2%/3 | 6.5 |
| 53 | 48.5% PVC wire stripping material, 1.5% Coupling Agent | 33% Rolled Full Peanut Hulls; 15.5%, 0.015" Thick, 1" long Filone grind DF | 1 | 1 (500 hrs.) | 9.0%/2 | 4 |

The agricultural furnishes performance were mixed. The samples with juniper and sagebrush performed very well; the samples with peanut shells, almond hulls, and straw were uneven. It is unclear whether the use of PVC that did not achieve full liquefaction and thus created poor bonding was the major cause of this uneven performance, or whether it was due to the fiber itself. It did appear that the straw, peanut shells, and almond hulls did break down and turn white where they were intensely exposed to the UV radiation.

The fibers that were encapsulated in polyethylene performed much better than those in PVC. Both the sagebrush and the juniper sample appeared as though nothing had happened to them. The peanut hull sample with HDPE film as the plastic performed reasonably well, but the peanut hull sample with PVC plastic fell apart. It appears that the peanut and almond hulls do tend to breakdown in UV exposure faster than wood. The straw sample did very poorly; this is probably due to the low resistance of the fiber to UV exposure and the fact that the PVC plastic did not completely melt at the time of manufacture Close examination of the samples reveals that putting any kind of coating on the surface of the thermoplastic cellulose composite helps protect the material from UV degradation. All of the painted samples, stained samples, and paper coated samples performed exceptionally well. At first glance it appeared that Samples #30 and 32, which were both coated with latex, did experience some surface pop. However; on closer examination of the control samples that were unexposed, it appeared that the surface pop appeared at the time the paint was applied rather than after exposure as was first assumed. Sample #33 had brown plastic coated lumber wrap facing that bleached completely white, but it still maintained its integrity. There was no detectable surface delamination with the paper facing of this sample or Sample #34; this indicates that the plastic welding employed to attach the paper to the thermoplastic/wood composite works very well.

The results indicate that use of coupling agents in the matrix improves thickness swell, and resistance to UV exposure. The coupling agent samples had some of the lowest moisture swell numbers and their surface pop resistance was also very good. The treated samples and the reformulated railroad ties also performed extremely well. It should be noted that both of these groupings used polyethylene as the matrix plastic. This plastic achieved a high degree of liquefaction when the composite was formed, and consequently it coated the fibers more completely than the PVC samples that were tested.

Mechanical Property Comparison with Other Materials

FIGS. 11–18 give a graphical picture of where Juniper furnish/polyethylene thermoplastic composites are positioned relative to other materials. One new group was created, group 3A, which shows the projected benefit to group 3A when a coupling agent is added; this group is only shown in FIGS. 11 and 12. The data shown in these tables is actual test data taken from tests with identical procedures to those reported here. The materials are off-the-self competing materials. The reader should note that the OSB and Masonite specimens were commercial siding products that are specially produced for this market. Consequently the numbers shown for these materials represent the best performance that can be expected for these classes of materials in an exterior environment. Edgewise shear measures the force required to shear the material. It's very important in highly loaded short span loading conditions.

Conclusions of Test Results

The data presented in Table 1 indicate that all of the composite formulations tested except Formulation IA would make acceptable material for sign applications. The data in Table 1 related to moisture response demonstrate the superior properties of the composites of the present invention. Data presented in FIGS. 17 and 18 indicate that these juniper/polyethylene thermoplastic composites have very competitive linear expansion and thickness swell numbers. Good moisture stability numbers indicate that the inventive composite materials exhibit very little movement when subjected to varying moisture conditions; this means that the application of thin overlays to this class of substrate are not likely to exhibit de-lamination or cracking.

The data presented in Table 2 indicate that the inventive composite materials weather very well. The samples that were placed in the weatherometer showed almost no degradation. Tests on similar polyethylene thermoplastic wood composites which subjected them to the much harsher environment of a Termatron (soak, −40F, and +140F cycles) have shown that these materials perform, in many regards, better than currently available wood composites.

The strength and stiffness data for the composites of the present invention are good; they exceed the particle board and hardboard siding standard of 1800 psi modulus of rupture. Data presented in FIGS. 11 and 12 indicate that these materials are on the low end in terms of strength and stiffness when compared with competing materials. Typically the modulus of elasticity (MOE), which is a measure of stiffness, is in the range of 250–350 psi for composite board materials. The juniper polyethylene composites performed below those values. The present invention also encompasses the addition of coupling agent, which increase the bond between the juniper and the plastic. The use of coupling agents can increase stiffness and strength about 30%. However, an alternative to coupling agents, that provides additional benefits, results from decreasing the particle size of the wood and plastic. Stiffness (or rigidity) is important if the product you're competing against is a panel of equal thickness.

The internal bond numbers and the nail withdrawal data (FIGS. 13 and 14) show that the composite materials of the present invention hold fasteners very well. The relatively high internal bond numbers are an indication that edge splitting from nails driven close the edge will be minimal; this has been shown in actual test experience with these materials. The data presented in Table I indicate that the inventive composites also hold screws well. Heating and partial melting of plastic during insertion followed by cooling and solidification is a possible mechanism for nail and screw performance. The effect of frictional heat is that the plastic tends to mold itself around the nail, which tends to increase holding power.

FIG. 5 shows data from the sieve analysis of formulation 1A and reveals that this mix had a very high percentage of fines relative to the plastic particles. This is probably why its strength and stiffness performance was less than the other formulations. High percentages of furnish fines relative to the percentage of plastic tends to produce non-homogeneous boards with areas of clumped fines that have very low amounts of binder. The result is a weak spot in the board. The data from this test series suggests that the juniper furnish will have to undergo further processing to make an acceptable product for sign applications. Again, a decrease in the particle size of the wood and plastic overcame these limitations and produced a superior product. For example, a hammermill was used to produce a final particle size of approximately 0.03125 inch starting from whole one-seed juniper trees.

Tests show that this class of materials has very good impact resistance and recovery when polyethylene type plastics are used.

Uniformity of particle size is achievable by sifting the material and/or grinding to a particle size wherein fines are not substantially smaller than the desired grind size. For example, a 1/32 inch hammermill achieves particles comprising an average size closer to fines than does a 1/4 inch hammermill. According to the present invention, sifting is optionally performed on material to achieve a more uniform size distribution.

Regardless of the particle size, according to the present invention, calculations are used to determine the amount of wood and plastic that are needed to form a final product. In general, the starting wood and plastic densities are known as is the density of a starting mixture of wood and plastic. Of course, the density of the mixture includes voids between wood and/or plastic particles. For given dimensions of a final product, a final product volume is calculated. An estimate of final product density is obtained from the wood and plastic densities and the relative fraction of wood and plastic. Next, a final product weight is determined using the estimated final product density. Using the final product weight, an equal weight of wood and plastic mixture is prepared. For the press method, this weight of wood and plastic forms the mat, whereas for the extrusion method, mass/weight flow rates are involved. The final product is checked against the originally specified dimensions and a correction factor is determined if needed. Accordingly, the weight of the wood and plastic feed is adjusted. Alternatively, a final product density is determined and used instead of a final product estimated density. Again, most importantly, the final product is checked against initial specifications to ensure quality.

In the aforementioned examples (Boards 1A, 1B, 2A, 2B, 2C, and 3A) the particle size distribution of the wood and plastic generally comprises an average size between approximately 0.0469 inch and approximately 0.25 inch. In a preferred embodiment of the present invention the particle size distribution of the wood and plastic comprises an average size less than approximately 0.0937 inch and more preferably an average size of less than approximately 0.0331 inch. For example, use of a hammermill with a screen size of 1/32 inch (0.03125 inch) results in wood and/or plastic particles comprising an average size less than approximately 0.0331 inch. As mentioned above, particles from a hammermill often comprise a dimension greater than the size of the hammermill screen (refer to FIGS. 1a and 1b); however, at least one dimension of a particle will be less than or equal to that of a screen opening in order for the particle to pass through the screen. Thus, where the size of a particle is mentioned, it refers to a particle comprising at least one dimension of that size. Where an average particle size is mentioned, this refers to particles comprising at least one dimension of that size. Again, this description is sufficient for one of ordinary skill in the art of particle and/or sieve analysis to understand and appreciate.

The aforementioned adjustments to average particle size and/or particle size distribution have improved the overall quality of the composite product and eliminated many shortcomings associated with the aforementioned larger particle size products. In particular, the surface characteristics are greatly improved. The smaller particle size material also facilitates use of extrusion methods as described supra.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A composite material comprising natural material particles and plastic wherein said natural material particles comprise particles ground from a whole tree, including trunk particles, branch particles, needle particles, and bark particles, said particles having an average particle size of less than approximately 0.25 inch, and said whole tree is selected from the group consisting of conifers and junipers.

2. The composite material of claim 1 wherein said natural material particles comprise an average moisture of less than approximately 5%.

3. The composite material of claim 1 wherein said natural material particles comprise an average moisture of less than approximately 2%.

4. The composite material of claim 1 wherein said natural material particles further comprise root particles.

5. The composite material of claim 1 wherein said natural material particles comprise particles ground from whole one-seed juniper trees.

6. The composite material of claim 1 wherein said natural material particles comprise particles ground from whole ponderosa pine trees.

7. The composite material of claim 1 wherein said natural material particles comprise a random orientation in said composite material.

8. The composite material of claim 1 wherein said natural material particles comprise a process-related orientation.

9. The composite material of claim 1 wherein said natural material particles comprise an average particle size of less than approximately 0.125 inch.

10. The composite material of claim 1 wherein said natural material particles comprise an average particle size of less than approximately 0.0625 inch.

11. The composite material of claim 1 wherein said natural material particles comprise an average particle size of approximately 0.03125 inch.

12. The composite material of claim 1 wherein said natural material particles comprise an average particle size of less than approximately 0.03125 inch.

13. The composite material of claim 1 wherein said plastic comprises a thermoplastic.

14. The composite material of claim 1 wherein said plastic comprises a plastic selected from the group consisting of polypropylene, polyethylene, polyurethane and polyvinylchloride.

15. The composite material of claim 1, said composite material comprising at least approximately 20% by weight of natural material particles.

16. The composite material of claim 1, said composite material comprising at least approximately 40% by weight natural material particles.

17. The composite material of claim 1, said composite material comprising approximately 50% by weight of natural material particles.

18. The composite material of claim 1, said composite material comprising at least approximately 20% by weight of plastic.

19. The composite material of claim 1, said composite material comprising at least approximately 40% by weight of plastic.

20. The composite material of claim 1, said composite material comprising approximately 50% by weight of plastic.

21. The composite material of claim 1, said composite material comprising a contiguous plastic layer comprising included natural material particles.

22. A composite material comprising natural material particles and plastic wherein said natural material particles comprise particles ground from a whole juniper tree, including trunk particles, branch particles, needle particles, and bark particles, said particles having an average particle size of less than approximately 0.125 inch, and said composite material having an average water absorption of less than about 16 weight percent.

23. The composite material of claim 22 having a 6d nail withdrawal load of at least 100 pounds per inch.

24. The composite material of claim 22 having an edgewise shear stress of at least 700 psi.

* * * * *

UNITED STATES PATENT AND TRADEMARK OFFICE
CERTIFICATE OF CORRECTION

PATENT NO.     : 6,586,504 B1
DATED          : July 1, 2003
INVENTOR(S)    : Phil T. Archuletta et al.

It is certified that error appears in the above-identified patent and that said Letters Patent is hereby corrected as shown below:

<u>Title page,</u>
Insert item: -- [73] Assignee: United States of America Secretary of Agriculture, Washington, DC --

Signed and Sealed this

Sixth Day of January, 2004

JAMES E. ROGAN
*Director of the United States Patent and Trademark Office*